US011048690B2

(12) United States Patent
Smith et al.

(10) Patent No.: US 11,048,690 B2
(45) Date of Patent: Jun. 29, 2021

(54) CONTRIBUTION OF MULTIPARTY DATA AGGREGATION USING DISTRIBUTED LEDGER TECHNOLOGY

(71) Applicant: ADOBE INC., San Jose, CA (US)

(72) Inventors: Kevin Gary Smith, Lehi, UT (US); John Bevil Bates, Highland, UT (US)

(73) Assignee: ADOBE INC., San Jose, CA (US)

( * ) Notice: Subject to any disclaimer, the term of this patent is extended or adjusted under 35 U.S.C. 154(b) by 268 days.

(21) Appl. No.: 16/198,541

(22) Filed: Nov. 21, 2018

(65) Prior Publication Data

US 2020/0159847 A1    May 21, 2020

(51) Int. Cl.
  *G06F 7/00*    (2006.01)
  *G06F 16/23*    (2019.01)
  *G06F 16/27*    (2019.01)

(52) U.S. Cl.
  CPC ...... *G06F 16/2379* (2019.01); *G06F 16/2365* (2019.01); *G06F 16/27* (2019.01); *H04L 2209/38* (2013.01)

(58) Field of Classification Search
  CPC .. G06F 16/2379; G06F 16/27; G06F 16/2365; G06F 16/1824; H04L 2209/38
  See application file for complete search history.

(56) References Cited

U.S. PATENT DOCUMENTS

| | | | | |
|---|---|---|---|---|
| 10,796,393 | B2 * | 10/2020 | Messerges | G06F 16/27 |
| 2009/0259526 | A1 * | 10/2009 | Bechtel | G06Q 30/0203 |
| | | | | 705/7.32 |
| 2012/0278767 | A1 * | 11/2012 | Stibel | G06Q 40/025 |
| | | | | 715/854 |
| 2016/0224803 | A1 * | 8/2016 | Frank | G06F 16/24578 |
| 2017/0111175 | A1 * | 4/2017 | Oberhauser | H04L 63/08 |
| 2017/0222814 | A1 * | 8/2017 | Oberhauser | G06F 21/33 |
| 2017/0287068 | A1 * | 10/2017 | Nugent | G06Q 20/065 |
| 2017/0353311 | A1 * | 12/2017 | Schukai | H04L 9/0618 |
| 2018/0139056 | A1 * | 5/2018 | Imai | H04L 9/3236 |
| 2018/0234433 | A1 * | 8/2018 | Oberhauser | H04L 9/3236 |
| 2018/0240112 | A1 * | 8/2018 | Castinado | G06Q 20/381 |
| 2018/0344215 | A1 * | 12/2018 | Ohnemus | A63F 13/798 |
| 2018/0365670 | A1 * | 12/2018 | Dunjic | G06Q 20/206 |
| 2019/0130453 | A1 * | 5/2019 | Sasapu | G06Q 30/0631 |
| 2019/0156923 | A1 * | 5/2019 | Kain | G06F 16/2379 |
| 2019/0179951 | A1 * | 6/2019 | Brunet | H04L 9/3239 |
| 2019/0370866 | A1 * | 12/2019 | Lawbaugh | H04L 9/0637 |
| 2020/0076615 | A1 * | 3/2020 | Redpath | H04L 9/3218 |

* cited by examiner

*Primary Examiner* — Mohammed R Uddin
(74) *Attorney, Agent, or Firm* — Shook, Hardy & Bacon L.L.P.

(57) ABSTRACT

In various embodiments, a request may be received identifying items of information and an entity requesting the items. A set of entities may be determined It may be determined, for a response to the request, that collectively has access to a set of values that captures each of the items requested by the entity. A transaction of a transaction block may be created on a blockchain maintained at least in part by one or more nodes of a distributed ledger system. The transaction may be digitally signed and identify the set of entities, and contribution scores of the values to the set of values. Each contribution score for a given value of an item being based on a level of scarcity of the item and a level of usage of the item. The blockchain may identify a scoring algorithm used to determine the contribution scores.

20 Claims, 9 Drawing Sheets

CONTRIBUTION OF MULTIPARTY DATA AGGREGATION USING DISTRIBUTED LEDGER TECHNOLOGY

BACKGROUND

Different entities often employ similar information, or data, for various applications, such as software and services. Lack of a particular type of information for an application or the use of low quality information (e.g., inaccurate, outdated, or invalid) by the application can result in the application making erroneous or unreliable determinations. Typically, different entities maintain or reserve their own data. For example, each entity may have its own user profile regarding the same individual based on the user information it is able to collect regarding a user. Some entities may be better adapted to collect certain types of information than others, such that the types of information and the quality of the information varies across the entities. For example, for an individual's age, one entity may require a birth certificate to verify the individual's age, whereas another may rely solely on user input, and still another entity may infer the individuals age based on user interactions with a website.

Although additional or higher quality information may exist for an application, entities typically rely on their own data due to various barriers to sharing data with other entities. The data remains siloed amongst the entities, such that large quantities of computer storage is consumed by low quality and/or redundant data and entities may rely on incomplete or low quality data sets for their applications. Entities may refrain from sharing data due to difficulties in ascertaining the magnitude of their contributions in a reliable, predictable, and transparent manner. Further, an entity may refrain from sharing data with another entity because it may be difficult to enforce restrictions on how the shared data is used and the sharing of the data with additional entities. Other factors include that once data is shared, it may become less scarce and therefore less valuable, and that regulations may exist on how and what data, such as user information, is shared.

SUMMARY

Embodiments of the present disclosure relate to contribution of multiparty data aggregation using distributed ledger technology, such as blockchain. Systems and methods are disclosed related to distributed ledger-based systems and methods allowing for the effective and efficient sharing of data for use by other entities using contribution scores that capture contributions of entities to data aggregated from multiple parties. In some respects, entities may share data in a manner that their contributions to the aggregated data are captured in a reliable, predictable, and transparent manner.

In some embodiments, an entity provides a request regarding a plurality of items of information (e.g., a user's age, a user's country). The request may be provided to an entity system, and/or recorded on a distributed ledger of a distributed ledger system. Based on the request, a set of entities are determined that collectively has access to a set of values for each the plurality of requested items. This may include matching or selecting offers from the entities to provide values of items to the request. Contribution scores of the values to the set of values are determined using a scoring algorithm, and a transaction(s) of a transaction block(s) of the distributed ledger is created. The transaction is digitally signed and identifies the set of entities and the contribution scores of the values to the set of values. Using the distributed ledger, the contribution scores of values with respect to a request can be captured in a transparent manner that mitigates potential barriers to sharing the data for use by other entities. Thus, entities may effectively leverage aggregated data provided from multiple entities, reducing information storage requirements and improving the quality of information consumed by applications.

BRIEF DESCRIPTION OF THE DRAWINGS

The present invention is described in detail below with reference to the attached drawing figures, wherein.

DETAILED DESCRIPTION

Figure 1:
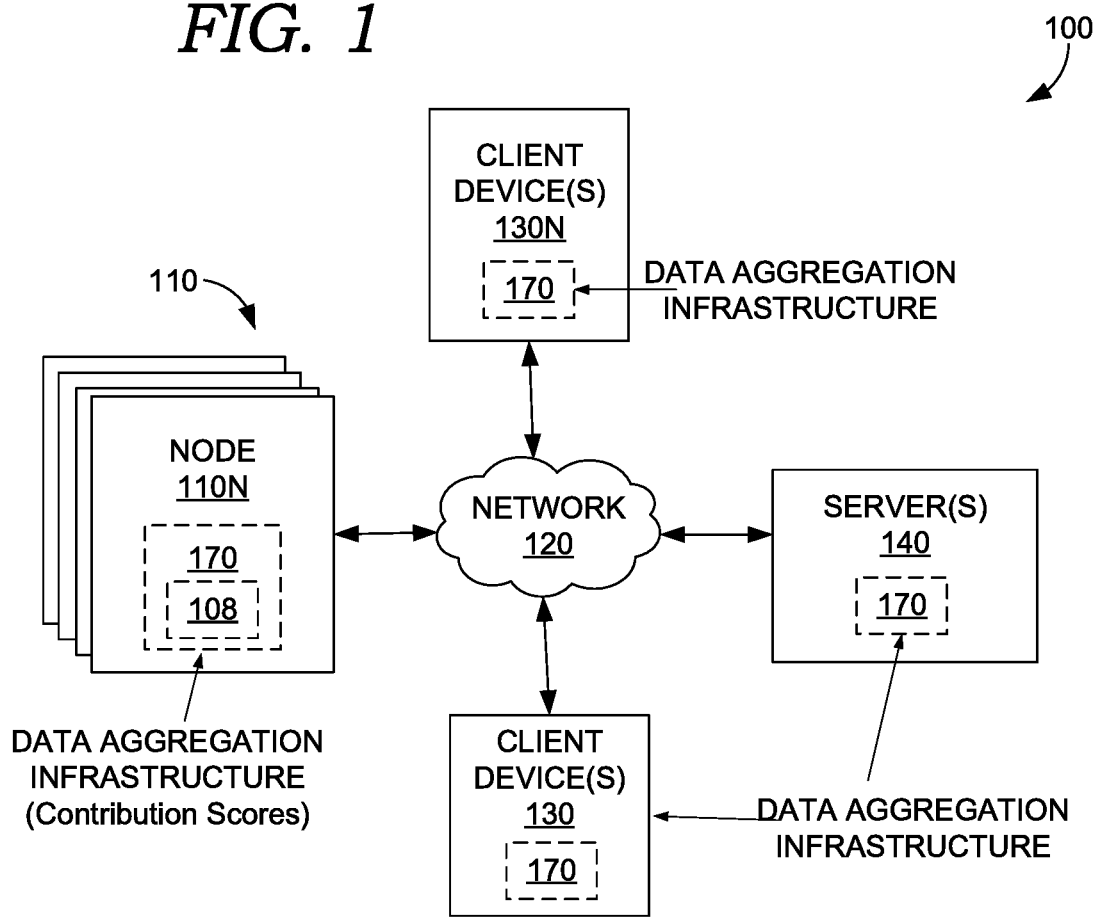
FIG. 1 is an example system diagram of a data sharing system in accordance with some embodiments of the present disclosure.

Although additional or higher quality information may exist for an application, entities typically rely on their own data due to various barriers to sharing data with other entities. The data remains siloed amongst the entities, such that large quantities of computer storage is consumed by low quality and/or redundant data and entities may rely on incomplete or low quality data sets for their applications.

Entities may refrain from sharing data with other entities due to difficulties in ascertaining the magnitude of their contributions in a reliable, predictable, and transparent manner. In a typical example, entities, such as companies, negotiate comprehensive arrangements with other entities dictating the parameters of sharing data amongst the entities. Entities often avoid making these arrangements for various reasons including the complexities involved in assessing the relative value of data from each entity. For example, one entity may be unable to reliably ascertain the quality of another entity's data. Also, the quality of an entity's data set may change over time as new data is added, algorithms change, or information becomes outdated. Further, once data is shared, the data becomes less scarce and therefore less valuable. Thus, if an arrangement is reached between entities, one entity may at some point conclude another entity is disproportionately benefiting from the arrangement.

Further, an entity may avoid making a data sharing arrangement with other entities when other entities do not have sufficient data to be worth the effort of negotiation and/or risk involved in sharing data. For example, it may be difficult to enforce restrictions on how the shared data is used and the sharing of the data with additional entities. Once data is shared with another entity, the other entity typically has the ability to use the data as it pleases, including in manners that violate the agreement with the entity sharing the data, violate agreements of the sharing entity with other parties, violate regulations on how and what data, such as user information, is shared, or otherwise are disagreeable to the sharing entity. As another example, a security breach of the entity that receives that data may have ramifications for the sharing entity.

Systems and methods are disclosed related to distributed ledger-based systems and methods allowing for the effective and efficient sharing of data between entities using contribution scores that capture contributions of entities to data aggregated from multiple parties. In some respects, entities may share data for use by other entities in a manner that their contributions are captured in a reliable, predictable, and transparent manner when multiple parties are contributing to aggregated data. Using approaches described herein, various barriers to the sharing of data between entities may be alleviated, such that less data remains siloed amongst the entities and more data is shared there between. This may reduce the amount of computer storage consumed by low quality and/or redundant data and entities may rely on more complete and high quality data sets for their applications.

Various terms are used throughout, some of which are described below:

An "entity" may refer to a user and/or a legal entity, such as an association, corporation, partnership, proprietorship, trust, or individual. An "entity" additionally or alternatively may refer to a digital identify, such as a digital account (e.g., a user account), which may be assessed by one or more legal entities.

An "item of information" may refer to a particular type of information, such as a data element or object (e.g., a data field) of a schema, a common information model, or standard data model, which may assume different values. For example, an item of information may represent a user's city of residence and for one user the value may be "San Jose," and for another user the value may be "Alexandria."

A "contribution score" may refer to a score that represents the relative value or worth of one or more values to a larger set of values. For example, where data is provided to an entity using a set of values, each value may be assigned a contribution score relative to other values.

A "scoring algorithm" may refer to a set of executable code or instructions, such as one or more scripts and/or program code sets that output a set of contribution scores for a request when executed. For example, for a set of values corresponding to a response to the request, the scoring algorithm may assign each value or group of values of the set a corresponding contribution score. In some cases, a scoring algorithm calculates one or more of the contributions scores, such as using a metric, or formula.

Embodiments of the present disclosure provide, at least in part, for allowing entities to request data regarding items of information, and receive the data in response. The data may include or be based on a set of values of the items that are provided by (e.g., owned by) one or more other entities. Records of responses (potential and/or actual) to requests regarding items of information may be recorded on a distributed ledger. A record may include contribution scores of values to the set of values used for a response, as well as associated entities providing access to the values.

Using this approach, data can be aggregated from multiple entities in a transparent manner, while creating a substantially immutable record for a request describing entities and the items of information that contributed to data aggregated from entities, as well as corresponding contributions of the values provided by the entities in response to the request. Using this approach, data may be aggregated and recorded on a per request basis, where the contributions accurately reflect the value or worth of the data at or near the time of exchange. Thus, one entity is less likely to disproportionately benefit from the transaction, as the data may be aggregated in an ad hoc and discrete manner, which further enhances the sharing entity's control and security of its overall data set.

The contribution scores of values for a request may be determined using a scoring algorithm, which may be identified on the distributed ledger, such that the contribution scores are determined in a transparent, reliable, and predictable manner. For example, in some embodiments, the scoring algorithm is defined in one or more digitally signed transactions on the distributed ledger, and/or in code of one or more smart contracts used to determine the contribution scores. Additionally, or alternatively, the record of a response may include a hash, a link, or other identifier of the scoring algorithm.

In further respects, the request may optionally be recorded in one or more digitally signed transactions on the distributed ledger (e.g., signed by or on behalf of the requesting entity). The request may identify the requesting entity, the items for which values are to be provided, and/or a subject (e.g., user) to which the values pertain. In some embodiments, a user may use a user device that provides the one or more digitally signed transactions to the distributed ledger (e.g., using a wallet of the distributed ledger). As another example, an entity system (e.g., cloud platform) may provide the one or more digitally signed transactions to the distributed ledger (e.g., using a wallet of the distributed ledger) on behalf of the user, an entity corresponding to the entity system, or another entity. In some embodiments, a presence of a corresponding request may be used as a condition precedent (e.g., of one or more smart contracts on the distributed ledger) to determine contribution scores for the request, record a response to a request, determine entities for a response to a request, receive and/or process offers to provide values for a response, and/or perform other actions.

Based on receiving of the request, the system may determine, for a response to the request, a set of entities that collectively has access to a set of values that captures each of the plurality of items requested by the entity. The response may optionally be one of many potential responses, from which an actual response may be selected (e.g., by the requesting entity or automatically). Determining the set of entities may include evaluating records of permissions or other indicators of which entities have access rights to values for the requested items. The permissions may be on the distributed ledger and/or an entity system.

Further, determining the set of entities may include matching offers for entities to provide values of items for requests. For example, an entity may offer to provide a value for a particular request (e.g., by referencing the request record on the distributed ledger) and/or provide a more general offer. Other criteria may be specified for an offer, such as an offer worth to be provided for the value(s), which may be factored into contribution scores. Optionally, offers may be recorded on and/or accessed from the distributed ledger, further enhancing the transparency of the exchange of data.

Contribution scores for a request may be based on various factors. In some embodiments, a contribution score for a value of an item is based on a level of scarcity of the item indicated by a records set. For example, the level of scarcity may be based on how many entities have provided an offer for the item and/or a number of offers for the item (e.g., determined from analyzing offers on the distributed ledger). Additionally or alternatively, the level of scarcity may be based on how many entities have access to a value for the item (e.g., determined from analyzing permissions on the distributed ledger). As another example, a contribution score for a value of an item may be based on a level of usage of the item indicated by a records set. For example, the level of usage may be based on how many requests and/or actual responses involve the item (e.g., determined from analyzing request and/or response records on the distributed ledger).

The level of usage and the level of scarcity for an item represent reliable indicators of a value's contribution to a provision of data. Further, in some embodiments, the data used to determine the level of usage and the level of scarcity may be completely on the distributed ledger, allowing for a transparent and auditable record of how contribution scores were derived on the distributed ledger. Thus, entities may be ensured that the contribution scores are fairly and reliably determined.

In further respects, values may be shared by entities and/or data derived from the values. For example, a request may be for claims (e.g., true or false) of interrogatories (e.g., logical expressions) that are based on the values of the items corresponding to the request. The interrogatories may be specified in the request or otherwise associated with the request. Using this approach, the scarcity and privacy of the values can be protected. Interrogatories may be implemented using zero-knowledge proofs to ensure accuracy of the values involved in the claims.

Referring now to FIG. 1, a schematic depiction is provided illustrating an example distributed ledger network 110 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 can include, among other things, a distributed ledger network 110 comprising a plurality of nodes 110N, such as the nodes 110A-110F later described with reference to FIG. 2, each in direct or indirect communication with one another via the network 120. It is contemplated that the nodes 110N can include a subset of designated nodes authorized to perform specifically-designated operations, such as validation, verification, or block generation, among other things. To this effect, nodes may work collectively to maintain a distributed ledger of a distributed ledger network 110 using a consensus module (not shown) that is independently included and operated by any number of nodes 110N. While any node may be capable of generating a transaction to be added to the distributed ledger, the consensus module may require that the record be added to the distributed ledger only based on a determination that a consensus (e.g., greater than 50%) of the nodes 110N (or designated nodes) has collectively validated the transaction. In this regard, while each node 110N may independently store a copy of the distributed ledger, a record may only be added to the distributed ledger when a consensus to add the record has been reached by the nodes 110N (or designated nodes) of the distributed ledger network 110.

The system can also include one or more client devices, such as client devices 130, 130N. It is contemplated that any one or more of the nodes 110N may optionally be a client device 130, 130N, and one or more client devices, 130, 130N may optionally be a node in accordance with embodiments described herein. Nodes 110N and client devices 130, 130N may be computing devices also described herein in accordance with FIG. 9.

In one aspect, a client device 130, 130N can include a consensus module (such as consensus module 330 of FIG. 3) similarly included in nodes 110N (or designated nodes) within the distributed ledger network 110. In another aspect, the client device 130, 130N can generate transactions that can initially be validated locally, via the consensus module included therein, before the transaction is passed on to other nodes. In another aspect, a client device 130, 130N can be in communication with one or more nodes 110N via the network 120, and can locally generate a transaction for communication via the network 120 to one or more nodes 110N that the client device 130, 130N is in communication with. In this way, the one or more nodes 110N (or designated nodes) receiving the transaction directly or indirectly from the client device 130, 130N can validate the transaction in accordance with the present disclosure.

In some aspects, any node 110N can operate as a node that includes the consensus module, and any client device 130, 130N can operate as a client device that can: transmit communications to one or more nodes 110N, generate transactions, and receive communications (e.g., transaction status, distributed ledger data) from one or more nodes 110N. For purposes of simplicity, the following description will reference a client device 130, 130N as a node 110N, though embodiments are not limited as such.

Figure 4:
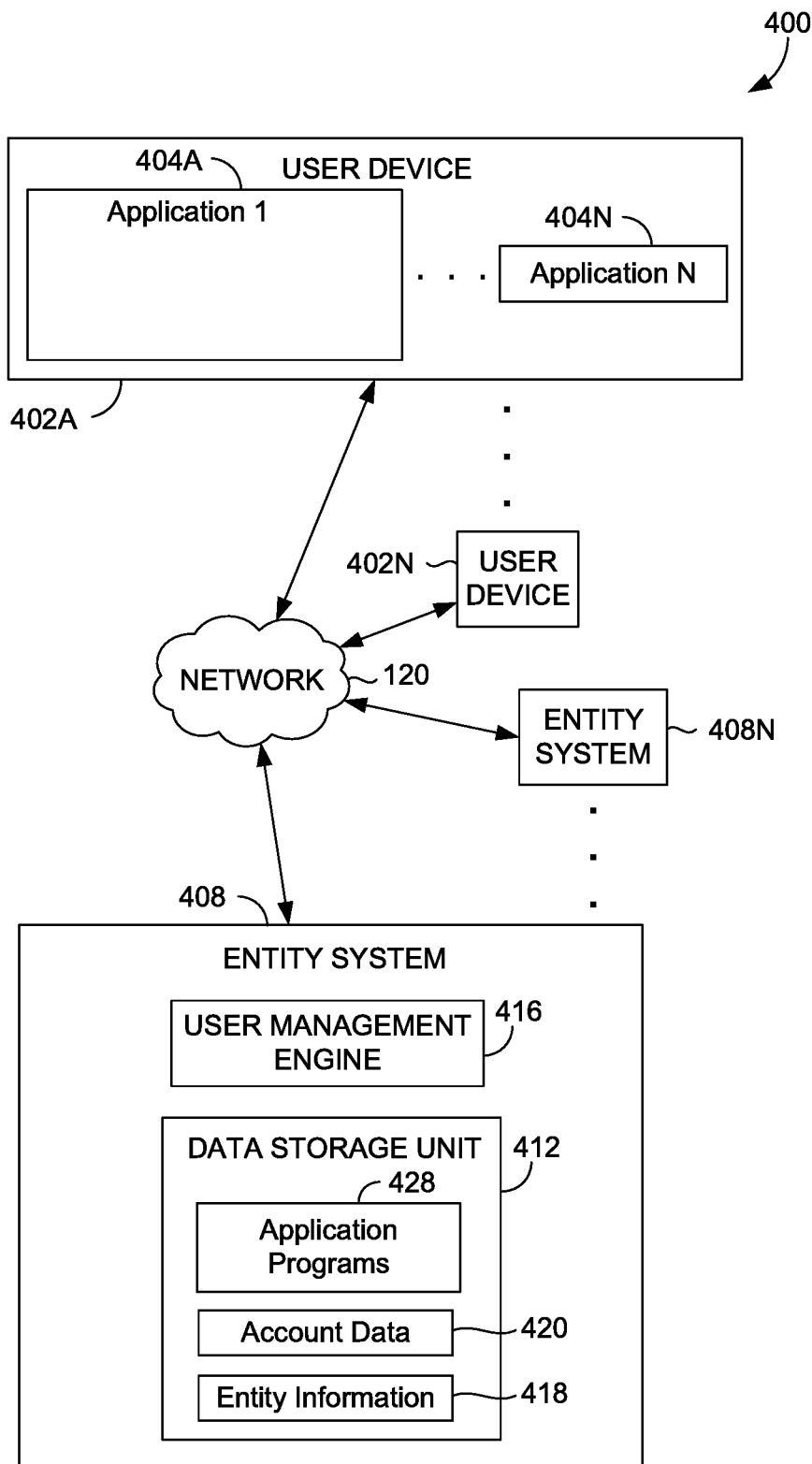
FIG. 4 is an example of an environment in which one or more embodiments of the present disclosure can be practiced.

In some embodiments, one or more of the client devices 130, 130N can be a user device of a user, such as a user device 402A of FIG. 4. Additionally, or alternatively, one or more of the client devices 130, 130N can be a system device, such as of entity system 408 of FIG. 4. User device 402A and entity system 408 are discussed in further detail below.

Each client device(s) 130, 130N may correspond to one client, or entity, and include any number of client devices, but may be referred to in singular for convenience. In some embodiments, a client device 130, 130N includes one or more server device(s), which may include one or more server devices of the entity system 408 of FIG. 4. The server device(s) can be in communication with one or more nodes 110N to send generated transactions to the one or more nodes 110N, request and receive transaction status information from the one or more nodes 110N, and/or request and receive distributed ledger data from the one or more nodes 110N, among other things. In some further embodiments, the server device(s) can include one or more computing devices, also described in accordance with FIG. 9, whereby the one or more computing devices include a consensus module to operate as a node 110N (or designated node). Among other things, the server device(s) can further provide one or more services, such as data storage services, web hosting services for one or more websites, user authentication services, certificate authentication services, backup services, data mining services, "cloud"-stored data or web search services, block explorer services, analytics services, and the like, including any combination thereof. Further examples are provided with respect to entity system 408 of FIG. 4.

In various embodiments, any combination of the components of system 100, such as nodes 110N, client devices 130, 130N, and/or server(s) 140 are used to implement any of the various components and functionality of data aggregation infrastructure 170. Data aggregation infrastructure 170 generally facilitates the aggregation of data from various entities using distributed ledger network 110. In doing so, various barriers to the sharing of data between entities may be alleviated, such that less data remains siloed amongst the entities and more data is shared there between. This may reduce the amount of computer storage consumed by low quality and/or redundant data and entities may rely on more complete and high quality data sets for their applications.

In some embodiments, entities may make requests for data regarding items of information using client device 130, 130N, server(s) 140 and/or node(s) 110N. Records 108 of responses (potential and/or actual) to the requests may be recorded on the distributed ledger of the distributed ledger network 110 (e.g., as transactions). A record 108 may include contribution scores of values to a set of values of the items for a response, as well as associated entities providing access to the values.

Using this approach, data can be aggregated from multiple entities in a transparent manner, while creating a substantially immutable record for a request describing entities and the items of information aggregated from the entities, as well as corresponding contributions of the values provided by the entities in response to the request. Using this approach, data may be aggregated and recorded on a per request basis, where the contributions accurately reflect the value or worth of the contributed data at or near the time of exchange. Thus, one entity is less likely to disproportionately benefit from the transaction, as the data may be aggregated in an ad hoc and discrete manner, which further enhances the sharing entity's control and security of its overall data set.

The contribution scores of values for a request may be determined using a scoring algorithm, which may be identified on the distributed ledger, such that the contribution scores are determined in a transparent, reliable, and predictable manner. For example, in some embodiments, the scoring algorithm is defined in one or more digitally signed transactions on the distributed ledger, and/or in code of one or more smart contracts used to determine the contribution scores. Additionally, or alternatively, the record 108 of a response may include a hash, a link, or other identifier of the scoring algorithm. Thus, entities may be ensured that the contribution scores are fairly and reliably determined. Further examples of data aggregation infrastructure 170 are provided with respect to data aggregation infrastructure 570 of FIG. 5.

Figure 2:
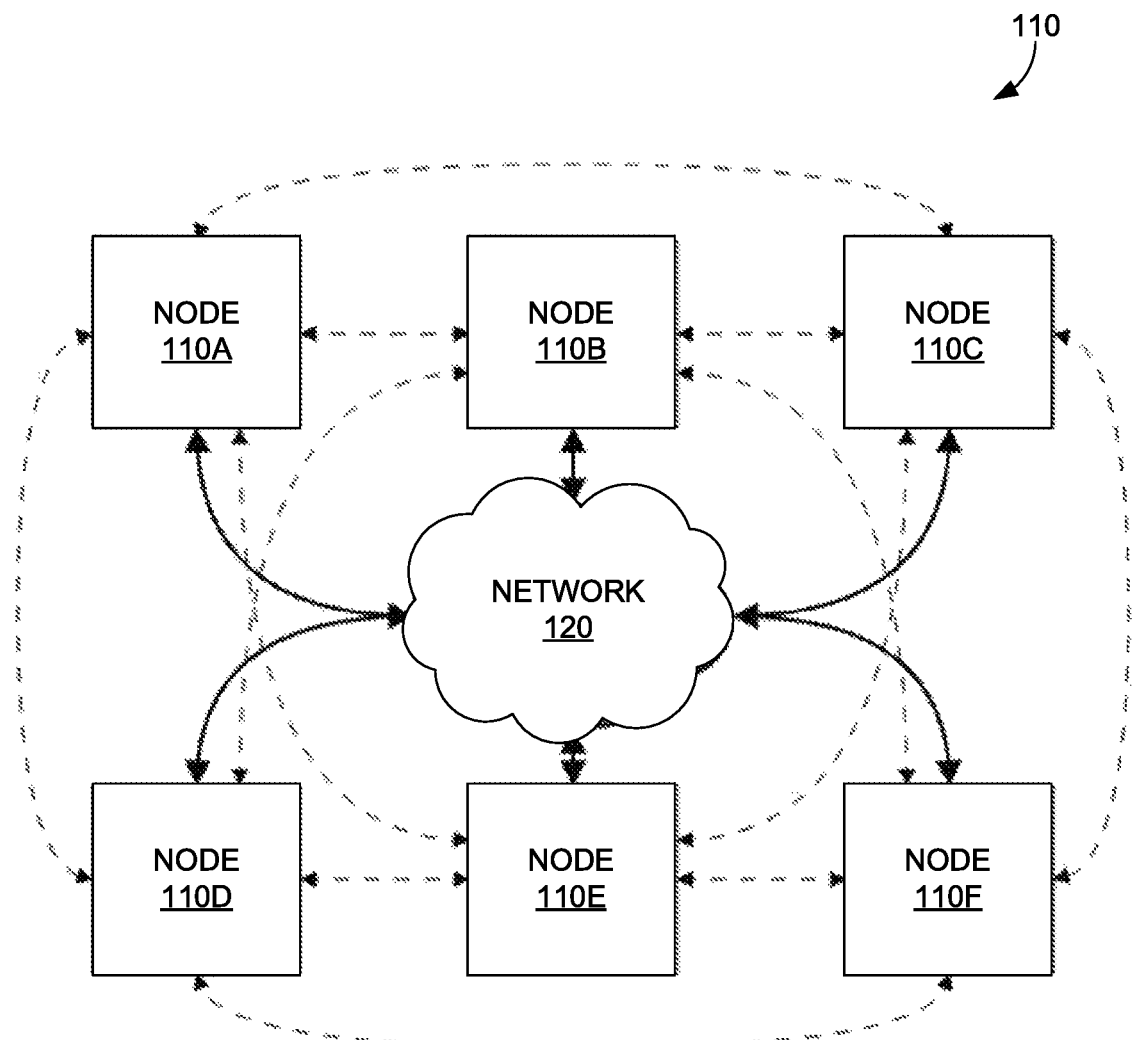
FIG. 2 is an example system diagram of a distributed ledger network in accordance with some embodiments of the present disclosure.

Turning now to FIG. 2 a schematic depiction is provided illustrating an example of distributed ledger network 110 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The distributed ledger network 110 depicted in FIG. 2 includes a plurality of nodes 110A-110F that are each in communication with one or more nodes 110A-110F over a network, such as the Internet. Nodes 110A-110F may corresponds to nodes 110N of FIG. 1. Each node 110A-110F is a node of a distributed ledger network, which may be a node as later described in accordance with FIG. 3, and which may also be a computing device later described in accordance with FIG. 9. In some embodiments, and preferably for public distributed ledger implementations, each node 110A-110F in the distributed ledger network 110 can operate as a peer to every other node 110A-110F of the distributed ledger network 110 such that no single node 110A-110F is more influential or powerful than any other node 110A-110F. Operations performed by nodes can include, among other things, validating transactions, verifying blocks of transactions, and adding records to an immutable database that is collectively maintained by the nodes 110A-110F. It is contemplated, however, that in some embodiments, a particular subset of the nodes 110A-110F can be specifically designated for performing a subset of or all node operations described herein. In this regard, as opposed to embodiments where each node is a peer with other nodes, some embodiments can employ specially-"designated nodes" (preferably for private distributed ledgers or ecosystems where centralization is not a concern) that perform a subset of or all of the described node operations.

In accordance with embodiments described herein, the immutable database collectively maintained by the nodes 110A-110F may be referenced to herein as a distributed ledger, such as a blockchain, a tangle, a hashgraph, and the like. By way of example only, FIG. 2 is described with respect to a blockchain, however, nodes 110A-110F may be nodes of other types of distributed ledger networks. The blockchain maintained by the distributed ledger network 110 includes a plurality of records that is immutable by virtue of the distributed nature of the distributed ledger network 110, applied cryptography concepts, and a consensus module (not shown) that is independently included and operated by any number of nodes 110A-110F. While any node may be capable of generating a transaction to be added to the blockchain, the consensus module may require that the record be added to the blockchain only based on a determination that a consensus (e.g., greater than 50%) of the nodes 110A-110F (or designated nodes) has collectively validated the transaction. In this regard, while each node 110A-110F may independently store a copy of the blockchain, a record may only be added to the blockchain when a consensus to add the record has been reached by the nodes 110A-110F (or designated nodes) of the distributed ledger network 110.

In various embodiments, validation of a transaction may be facilitated using features of asymmetric key cryptography (e.g., public-private key pairs), among other things. In some aspects, as is commonly known in public blockchains (e.g., Bitcoin), a private key can be employed to generate one or more associated public keys, encrypt data that can only be decrypted by an associated public key, and/or digitally sign data or transactions. On the other hand, a public key can be employed to decrypt data encrypted by an associated private key, encrypt data that only the private key can decrypt, and/or digitally authenticate a digital signature generated by an associated private key. As public keys can be shared freely, public keys generally function as "wallet addresses" that are associated with a private key. In this regard, digital tokens or other units of value (e.g., Bitcoin) can be "transmitted" from one wallet address (e.g., a public key of a sender) to another wallet address (e.g., a public key of a receiver). In actuality, however, the transmission of a digital token or unit of value is not a physical transfer, but is represented as a record of transfer from one wallet address to another that, if validated, is recorded onto the blockchain. The record may not be finalized (e.g., added to the blockchain), however, until the transfer is validated by a consensus of the nodes 110A-110F in the distributed ledger network 110.

To generate a transaction to transfer a digital token(s) or value, the owner of the sending wallet address may digitally sign the transaction with the private key associated with the sending wallet address. Nodes 110A-110F (or designated nodes) of the distributed ledger network 110 may independently determine that the transaction from the sending wallet address is valid by digitally authenticating the digital signature with the sending wallet address (e.g., the public key). The nodes 110A-110F (or designated nodes) may also independently determine, by referencing their independently-stored copy of the blockchain, that the sending wallet address is in fact associated with the digital token or value being transferred, or that the sending wallet address has sufficient liquidity (e.g., has a calculated aggregate value based on associated records in a local copy of the blockchain) to transfer the unit(s) of value. If a node (or designated node) in the distributed ledger network 110 determines that either of the foregoing conditions is not satisfied, the transaction may be determined to be invalid by the node and the transaction may not be passed on (e.g., communicated) to other nodes (or designated nodes) to which it is connected. On the other hand, if the node (or designated node) determines that both of the foregoing conditions are satisfied, the transaction may be determined to be valid and the node may pass on (e.g., communicate) the transaction, along with an indication that the node independently validated the transaction, to other nodes 110A-110F (or designated nodes) to which it is connected. As the nodes 110A-110F in the distributed ledger network 110 may all be directly or indirectly connected to one another, this validation process can continue until the nodes (or designated nodes) collectively determine that a consensus (e.g., a majority) has validated the transaction. The collective determination of consensus can be facilitated by virtue of each node (or designated node) maintaining a list of other nodes (or designated nodes) on the network (e.g., by I.P. address or other identifier) along with their respective determinations of transaction validity.

After a consensus of validity for a transaction has been reached by the nodes 110A-110F (or designated nodes), the transaction may await confirmation (e.g., addition to the blockchain). As the nodes 110A-110F (or designated nodes) can be peers with each other, any node (or designated node) can participate in the process of adding the transaction to the blockchain. For purposes of background, the blockchain includes records of validated transactions that are grouped into a cryptographically chained series of blocks, whereby each block includes a subset of these records. Any node 110A-110F (or designated node) may be capable of performing the process of block generation, which can be implemented in a variety of ways based on a consensus algorithm implemented within its consensus module including, but not limited to, proof of work, proof of stake, proof of authority, practical Byzantine Fault Tolerance, or Federated Byzantine Agreements. As the aforementioned processes for block generation are generally known in the art, additional detail for these processes are not described herein. It is contemplated, however, that any implementation of block generation and consensus determination can be employed in accordance with the present disclosure. More importantly, as the general outcome of block generation is relatively similar among these implementations, the following description is provided irrespective of the block generation aspect of the consensus module.

To add a validated transaction to the blockchain, the transaction may first be included into a block that is being generated by one of the nodes 110A-110F (or designated nodes) and subsequently validated by a consensus of the nodes (or designated nodes) in the distributed ledger network 110. The transaction can be independently included into a block, or grouped together with other transactions, either of which are included within the purview of the present disclosure. Such implementations may vary, however, based on consensus module design and/or a block size (e.g., memory limitation) implemented or defined within in the consensus module operated by the nodes 110A-110F (or designated nodes). The node generating the block may also include, into the block it is generating, a cryptographic hash of the block most-recently added to the blockchain. Once generated in accordance with consensus rules defined within the consensus module, the node generating the block can send the generated block to the nodes (or designated nodes) to which it is connected.

The nodes (or designated nodes) receiving the generated block can then verify that the block includes one or more valid transactions, includes a hash value of the block most-recently added to the blockchain, and was generated in accordance with the defined consensus rules. Upon verifying the foregoing, the nodes (or designated nodes) can pass on (e.g., communicate) the verified block to its neighboring nodes (or neighboring designated nodes). In this way, similar to how a transaction is validated by a determined consensus of the distributed ledger network 110, the generated block including at least the transaction can be verified by another determined consensus of the nodes (or designated nodes). When a determination is made by a consensus of the nodes 110A-110F (or designated nodes) that a block is verified, the newly-verified block may be added to the blockchain immediately subsequent to the previously-added block, the hash of the previously-added block being included in the newly-verified block. As such, each block may be cryptographically "chained" to a previous block and a subsequent block. The cryptographic hashes may facilitate maintenance of the order and accuracy of records included in the blockchain.

In some instances, if the same transaction is included into a block generated by different nodes (or designated nodes) and validated throughout the network within a substantially similar timeframe, the blocks can be temporarily confirmed leading up to a fork in the blockchain (e.g., two potential branches stemming from the main chain). The forked chain can be maintained by the nodes (or designated nodes) until a determination is made, by a consensus of the distributed ledger network 110, that one of the forks has a larger quantity of blocks than the other. Based on a subsequent determination that one of the forks is shorter than the other, the nodes (or designated nodes) can prune (e.g., delete) the shorter chain, and maintain the longer chain as the determinative blockchain.

In various embodiments, the blockchain is not necessarily limited to storing records relating to transfers of digital tokens or monetary value. In this regard, a record can include any type of electronic record, including but not limited to one or more transactions, smart contracts, electronic documents, images or other digital media, URIs, alphanumeric text, unique identifiers, I.P. addresses, timestamps, hashes of any of the foregoing, or references to any of the foregoing. Any of the foregoing examples can be viewed as being the subject of a transaction, or can be indirectly associated with a transaction. For instance, ownership of an asset stored in a medium other than the blockchain (e.g., a remote storage device, a cloud server, a database) can be referenced with a unique identifier. If the asset is a digital asset, a URI and/or hash of the digital asset can be the subject of the transaction. If the asset is a tangible asset, a unique identifier associated with the tangible asset can be the subject of the transaction. It is contemplated that any combination or alternative to the foregoing examples remain within the purview of the present disclosure.

With specific regard to smart contracts stored as records on the blockchain, a smart contract can include any algorithm that defines an action or event that is to be triggered based on a determination that one or more defined conditions precedent to the action or event have occurred or are satisfied. In various embodiments, a smart contract can be generated, transmitted, received, stored, validated, and/or verified by any node or computing device described in accordance with the present disclosure. It is further contemplated that a consensus module of each node or computing device in the distributed ledger network 110 may be capable of interpreting and executing a Turing complete programming language, such as Solidity, by way of non-limiting example. It is further contemplated that in some embodiments, the blockchain itself is implemented based on the same programming language.

In various embodiments, smart contracts stored on the blockchain can be associated with a corresponding address, similar to that of a wallet address. The smart contract can be assigned a corresponding address by the distributed ledger network 110, or can be associated with a wallet address associated with one or more private keys. Counterparties associated with a smart contract can verify, via their respective computing devices in communication with one or more nodes of the distributed ledger network 110, that the smart contract has been immutably stored onto the blockchain based on a determined consensus of the nodes 110A-110F.

As smart contracts can be stored on the blockchain, each node (or designated node) can independently determine whether a smart contract's defined conditions precedent have occurred in order to verify that the terms of the smart contract have been met. In various embodiments, each node (or designated node) can determine occurrence of defined conditions precedent based on electronic information communicated thereto or retrieved thereby. The electronic information can include, among other things, another transaction addressed to or referencing the smart contract, data from one or more computing devices remote from the distributed ledger network 110, data from a website, data from a database, published news events, published weather events, or any other type of electronic information that can be transmitted to or accessed by a node (or designated node) via the network 120.

Like other transactions, each node (or designated node) can communicate this verification to one or more neighboring nodes (e.g., other nodes in direct communication with the node or designated node) until a consensus of the nodes 110A-110F (or designated nodes) of the distributed ledger network 110 have collectively verified occurrence of the defined conditions precedent. Based on a determination that the defined conditions precedent has been verified by a consensus of the nodes 110A-110F, the event or action defined by the smart contract can be executed. In various embodiments, the event or action can include the processing of a transaction (e.g., a processing of a transfer for digital tokens or value) that is held or locked until a determination that the conditions precedent have occurred. In this regard, any digital asset that is subject to the smart contract can be locked (e.g., held in escrow) by the smart contract until the determination has been made.

Figure 3:
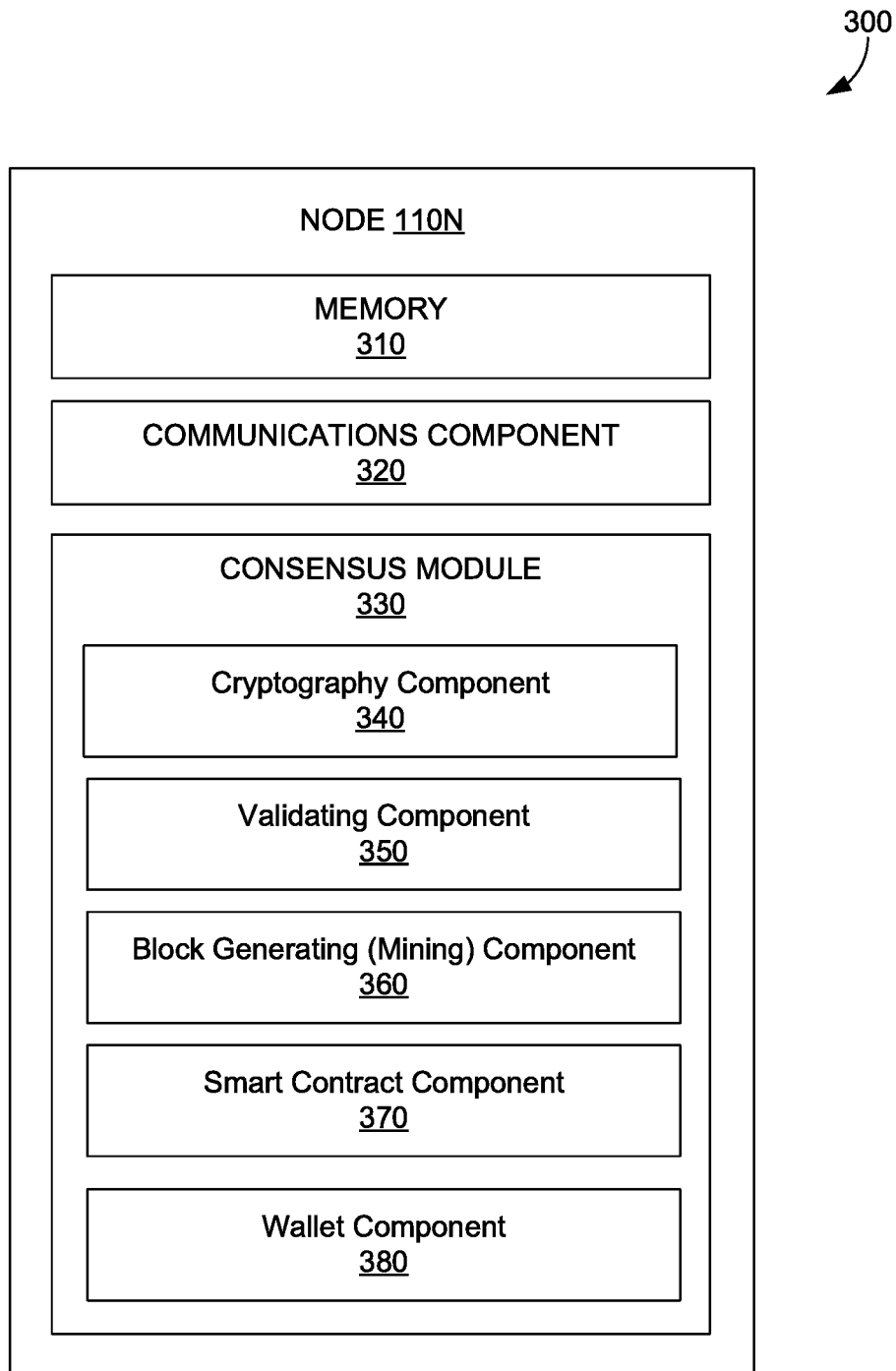
FIG. 3 is a block diagram depicting an example node of a distributed ledger network in accordance with some embodiments of the present disclosure.

Turning now to FIG. 3, a block diagram 300 is provided depicting example components of a node 110N (or designated node) in accordance with the present disclosure. The node 110N depicted in FIG. 3 can include, among other things, a memory 310, a communications component 320, and a consensus module 330. The memory 310 can include any type of memory, such as a hardware storage device, random access memory (RAM), a cache, read-only memory (ROM), and the like, including any combination thereof. The memory 310 can be employed to store executable computer code that, when executed by one or more processors of the node 110N, perform operations defined and/or implemented within the consensus module described herein. The memory 310 can also be employed to store data communicated from other nodes 110N, and/or client devices 130, 130N, such as those described in accordance with FIG. 1. The communicated data stored in memory can include, among other things, transactions, one or more blocks of a distributed ledger, determinations of validity, determinations of authentication/verification, unique identifiers and/or IP addresses of one or more nodes 110N, and other types of electronic data not limited to the foregoing.

The communications component 320 can include any type of communications device that enables the node 110N to communicate with other nodes 110N, and/or client devices 130, 130N, such as those described in accordance with FIG. 1. Communications can be facilitated utilizing wired or wireless communications, and can employ any short or long-range communications technology including, but not limited to, LANs, WANs, Ethernet, the Internet, WiFi, Bluetooth, NFC, optics (e.g., QR codes, Infrared), Zigbee, radio, RFIDs, and the like.

The consensus module 330 can include any number of components or subcomponents that, together with the memory 310 and communications component 320, enable the node 110N to operate as a peer node (or a peer to other "designated" nodes) in a distributed ledger network, such as distributed ledger network 110 described in accordance with FIG. 1. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Examples of components of the consensus module 330 include a cryptography component 340, a validating component 350, a block generating component 360, a smart contract component 370, and a wallet component 380. The cryptography component 340 may be used by the validating component 350, the block generating component 360, and the wallet component 380.

In some embodiments, the cryptography component 340 uses asymmetric cryptography (e.g., public-private key cryptography) for digital authentication/verification. Further, the cryptography component 340 may generate cryptographic hashes of data using a common-to-all-nodes hashing algorithm (e.g., SHA256, Scrypt, etc.). The cryptography component 340 may also be used to encrypt and decrypt data. For example, the data may be encrypted and stored on the distributed ledger using the cryptography component 340 and/or decrypted from data stored on the distributed ledger using the cryptography component 340. In this respect, data encrypted with a private key (from a private-public key pair), may be decrypted using an associated public key. However, data encrypted with a public key (from a private-public key pair), may only be decrypted using the private key. It noted that this is an example, and an entirely different encryption/decryption scheme may be used for encrypting/decrypting data for storage on the distributed ledger.

The validating component 350 may validate transactions by digitally authenticating digital signatures of transactions with a public key (e.g., of a sending wallet address). The validating component 350 may also verify "possession" and/or liquidity for the transactions based on a locally-performed cross-reference of the Distributed ledger for records associated with the public key (e.g., of the sending wallet address).

The block generating component 360 may perform the process of block generation, which can be implemented in a variety of ways based on a consensus algorithm implemented within the consensus module 330 including, but not limited to, proof of work, proof of stake, proof of authority, practical Byzantine Fault Tolerance, or Federated Byzantine Agreements.

The smart contract component 370 may be responsible for performing process used to implement smart contracts, such as has been described above. For example, the smart contract component 370 may interpret and execute smart contracts of the distributed ledger. Each node (or designated node) may need to verify occurrence of the conditions precedent of a smart contract(s) until at least a consensus has done so in order for a corresponding action or event to be triggered. The smart contract component 370 may verify occurrence based on data received and/or retrieved by the node 110N.

The wallet component 380 can securely store a private key (e.g., of a user and/or entity). The wallet component 380 may also filter out (from the locally-stored copy of the distributed ledger) all transactions associated with the public keys associated with the private key. This may be used so that a user and/or entity can view only those transactions that are relevant to the private key. In some embodiments, the wallet component 380 is associated with a graphical user interface (GUI) that provides a user and/or entity with a list of transactions of an associated private key(s). The wallet component 380 may receive inputs from a user and/or entity to generate transactions, and may sign those transactions with a secured private key. The wallet component 380 may also provide the user and/or entity with updates regarding the transaction status (e.g., via the GUI).

Turning now to FIG. 4, FIG. 4 is a diagram of environment 400 in which one or more embodiments of the present disclosure can be practiced. Environment 400 includes one or more user devices, such as user devices 402A-402N. Examples of user devices include, but are not limited to, a personal computer (PC), tablet computer, a desktop computer, cellular telephone, a processing unit, any combination of these devices, or any other suitable device having one or more processors. Each user device includes at least one application programs, such as applications 404A-404N. One or more of the applications 404A-404N may optionally be supported by one or more of entity systems 408A-408N.

Examples of entity systems include, but are not limited to, one or more of the server device(s) 140 described above with respect to FIG. 1, which can provide one or more services, such as data storage services, web hosting services for one or more websites, user authentication services, certificate authentication services, backup services, data mining services, "cloud"-stored data or web search services, block explorer services, analytics services, and the like, including any combination thereof. Further examples are described below with respect to entity system 408A. It is to be appreciated that following description may generally refer to user device 402A as an example and any other user device may be similarly used. Further, the following description may generally refer to entity system 408A as an example and any other entity system may be similarly used.

In various embodiments, the components of a node, a client device, and/or the data aggregation infrastructure of the example system 200 (e.g., node 110N, client device 130N, data aggregation infrastructure 170) can be implemented using any combination of the user devices 402A-402N and entity systems 408A-408N (or at least some of those components may be implemented using one or more other devices). For example, any combination of those components may be hosted completely and/or partially on user device 402A and entity system 408A. In particular, any combination of entity systems 408A-408N (e.g., with or without a user device) and user devices 402A-402N (e.g., with or without an entity system) may be used to carry out various embodiments of the present disclosure.

As an example, application 404A may interface with the distributed ledger network using a wallet component 380 hosted at least partially by the entity system 408, or the wallet component 380 may be completely hosted within a user device or at least partially by one or more other systems. As a further example, one or more applications 428 of entity system 408 may interface with the distributed ledger network using a wallet component 380 hosted at least partially by the entity system 408 (e.g., integrated into one or more applications 428). For example, any combination of the applications of user devices 402A-402N and entity systems 408A-408N may be used to initiate or define requests for items, establish offers to provide values for one or more items, determine contribution scores, select sets of entities, analyze the distributed ledger, analyze the offers, generate transactions and/or blocks, and/or perform other functionality described herein.

As indicated above, an entity may refer to a user and/or a legal entity, such as an association, corporation, partnership, proprietorship, trust, or individual, and/or a digital identity. A user may use user device 402A to interface with the distributed ledger network 110, as described herein, without employing an entity system 408. Additionally, or alternatively, the user may interface with the distributed ledger network 110 via an entity system 408. For example, the user may use one or more of applications 404A-404N on user device 402A to interface with the distributed ledger network 110, optionally via one or more application programs 428 of entity system 408. In this regard, the user may use one or more of applications 404A-404N (e.g., via a GUI which may be a the wallet component 380) to initiate requests for items, establish offers to provide values for one or more items, select the offers, enter the values of item, and/or provide or define any other inputs as described herein.

In various embodiments, entity system 408 may optionally translate user inputs to communications with the distributed ledger network 110, or may otherwise operate at the direction of users, as indicated by the user inputs, to communicate with the distributed ledger network 110. Additionally or alternatively, entity system 408 may interact with the distributed ledger network 110 without particular direction from the user inputs. As an example, entity system 408 may operate on behalf of one or more entities that are not users, such as an owner of entity system 408 and/or another entity system.

Entity system 408 includes data storage unit 412. Data storage unit 412 can be implemented as one or more databases or one or more data servers (e.g., of the servers 140 of FIG. 1). Data storage unit 412 includes data that is used by the engines of entity system 408. Data storage unit 412 includes one or more applications 428, which may implement any of the various functionality of data aggregation infrastructure 170 that is embodied using the entity system 408. For example, at least some of applications 428 may represent the various products, applications, or services supported by entity system 408 that a user of the user device 402A may interface with via network 120 (e.g., to share or manage the sharing of data associated with the user using the distributed ledger network 110). In some embodiments, data storage unit 412 includes account data 420 under which user details are stored. Applications 428 may manage the interface with the users based on the account data 420. Alternatively or additionally, such data can be stored at the user device, such as user device 402A.

Entity system 408 may optionally maintain entity information 418 in data storage unit 412. Entity information 418 may include information of entities, such as values of items of information and/or information used to generate the values, which may be shared using data aggregation infrastructure 170. The entity information 418 may be obtained in various manners, such as directly from the users and/or entities, from other users and/or entities (e.g., via data aggregation infrastructure 170), from inferences, determinations, and/or analysis of user inputs to the entity system 408 and/or application 404A, and more. It is noted that the sharing, storage, and collection of user and/or entity information should be implemented using best practices for maintaining privacy of entities and users.

A user of user device 402A may visit a webpage or an application store to explore and/or access applications 428 supported by entity system 408. Entity system 408 may provide one or more of the applications 428 as a software as a service (SaaS), or as a standalone application that can be installed on user device 402A (e.g., application 404A), or as a combination (e.g., application 404A). The user can create an account with entity system 408 by providing user details and also by creating login details that are captured in account data 420. Alternatively, entity system 408 can automatically create login details for the user in response to receipt of the user details. In some embodiments, the user can also be prompted to install an application manager. The application manager enables the user to manage installation of various applications supported by entity system 408 and also to manage other functionalities, such as updates, subscription account and the like, associated with the applications.

Upon download, installation and/or launching of an application program (e.g., application 404A and/or one or more of applications 428), in some embodiments, the user is asked to provide login details. A check on the login details may be performed by entity system 408 to ensure that the user is entitled to use the application program.

Figure 5:
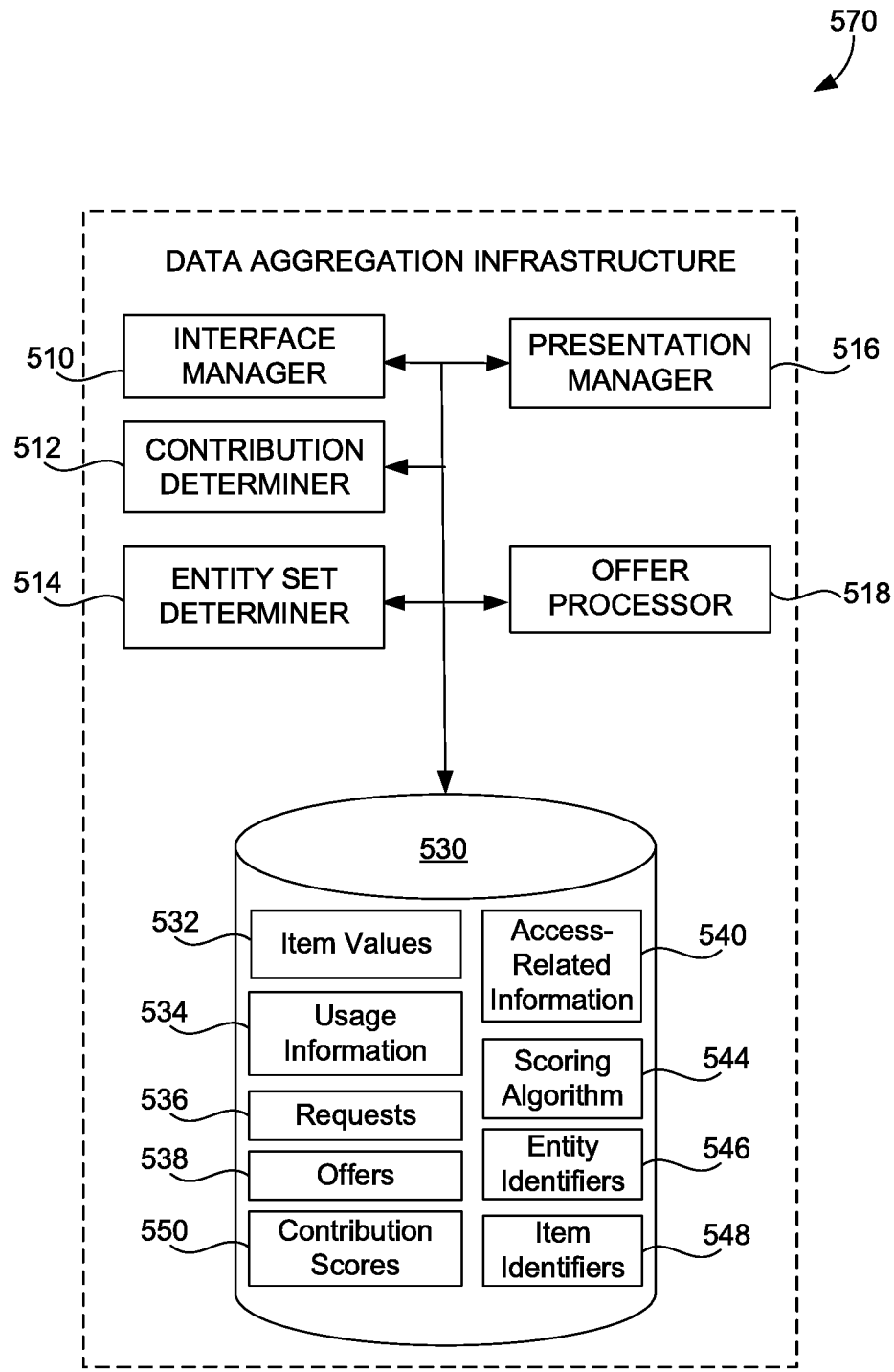
FIG. 5 is a block diagram depicting an example of data aggregation infrastructure in accordance with some embodiments of the present disclosure.

Turning now to FIG. 5, FIG. 5 is a block diagram depicting an example of data aggregation infrastructure 570 in accordance with some embodiments of the present disclosure. Data aggregation infrastructure 570 can correspond to data aggregation infrastructure 170 of FIG. 1. By way of example, data aggregation infrastructure 570 includes interface manager 510, contribution determiner 512, entity set determiner 514, presentation manager 516, offer processor 518, and storage 530.

As indicated above, the various components of data aggregation infrastructure 570 may be integrated in any of the combination of distributed ledger network 110, client device 130, 130N, and servers 140, variations of which are described herein. For example, the components may be implemented, at least partially, as or using one or more of application 428, application 404A, one or more smart contracts on the distributed ledger, and/or other software.

As an overview, interface manager 510 is generally responsible for managing interfaces between devices, systems, and/or entities. This may include receiving requests for values of items from entities and offers to provide values in response to requests. Contribution determiner 512 determines contributions of values of items to sets of values corresponding to requests for items of information. Entity set determiner 514 determines for a request, a set of entities that collectively has access to the set of the values. Offer processor 518 may processes offers of values, which may include verifying offers are valid (e.g., offering entities have access to the values), recording the offers, and associating offers with requests. Presentation manager 516 manages presentation of information on user devices, such as on a display or other output component of a user device (e.g., via a GUI). To this effect, the various components of data aggregation infrastructure 570 may use storage 530 to provide and/or store data used by the components. Examples of this data includes item values 532, usage information 534, requests 536, offers 538, access-related information 540, scoring algorithm 544, entity identifiers 546, item identifiers 548, and contribution scores 550. Storage 530 may represent any combination of data stores across the various devices and systems described herein. For example, data in storage 530 may be on the distributed ledger, on a user device, and/or in a private data store (e.g., of entity system 408).

As mentioned above, interface manager 510 is generally responsible for managing interfaces between devices, systems, and/or entities. This can include receiving and/or transmitting communications over network 120. Additionally, or alternatively, this can include receiving user inputs from user and/or providing outs to users (e.g., using presentation manager 516).

As an example, interface manager 510 may receive communications from user device 402A (e.g., from application 404A), entity system 408 and/or other entity systems 408N that initiate or define requests for items, offers to provide values for one or more items, contribution scores, selected sets of entities, and/or perform other functionality described herein (e.g., according to user inputs). Additionally or alternatively, interface manager 510 may provide communications to distributed ledger network 110 and/or receive information from distributed ledger network 110 (e.g., by scanning or analyzing the distributed ledger).

In some embodiments, a user and/or an entity makes a request optionally identifying a plurality of items of information and an entity requesting the plurality of the items. The request may be made by or on behalf of an entity (e.g., made by another entity). The entity and/or plurality of items of a request may be identified explicitly in the request and/or implicitly by the request. A request may optionally include a request worth, which may represent a monetary value (e.g., in a cryptocurrency of the distributed ledger) that is to be transferred to one or more other entities if a valid response it provided to the request. At least some of the request worth may be distributed to one or more entities that provide one or more values for a response to the request and/or one or more third party entities, such as based on the entity providing any of the various functionality of data aggregation infrastructure 570 (e.g., matching entities to requests for responses) and/or based on the entity operating a node of distributed ledger network 110 (e.g., as a block validation fee, mining fee, and the like).

Interface manager 510 may receive the request over one or more network communications. As an example, interface manager 510 of application 428 of entity system 408 may receive a request from user device 402A based on user input to application 404A. Additionally or alternatively, node 110N may receive the request from user device 402A and/or entity system 408. Additionally, or alternatively, node 110N (e.g., optionally using an executing smart contract) and/or entity system 408 may receive the request from one or more digitally signed transactions in one or more blocks of the distributed ledger of the distributed ledger network 110. For example, interface manager 510 may analyze the distributed ledger for requests (e.g., periodically or based on another trigger).

In some embodiments, entity system 408 generates one or more transactions that include or represent a request and records them to the distributed ledger, such that the distributed ledger network 110 receives the request. As another example, user device 402A may generate one or more transactions that include or represent the request, and the distributed ledger network 110 (e.g., the distributed ledger) may receive the request without use of entity system 408 (e.g., directly from the user device). Requests 536 represent records of the requests received by data aggregation infrastructure 570 that optionally may be persistently retained. For example, requests 536 may be recorded on the distributed ledger and/or in a private data store (e.g., of entity system 408).

Interface manager 510 may identify the entity and/or the plurality of items corresponding to the request. Identification may be performed, for example, by application 404A, application 428, and/or one or more smart contracts of the distributed ledger. As an example, the entity may be identified based on account data 420. For example, the request may be received while the entity is logged into a corresponding account, which entity system 408 uses to identify the user. In various embodiments, interface manager 510 may identify the entity based on an entity identifier (e.g., of entity identifiers 546) provided in or in association with the request. As one example, the entity identifier could correspond to a private key associated with the entity (e.g., the entity identifier could be a public key corresponding to the private key). Similarly, the request may identify the plurality of items using one or more item identifiers (e.g., of item identifiers 548), which correspond to the plurality of items, and/or individual items. As another example, the request itself may be specific to the plurality of items. For example, there may be different types of requests that correspond to different subsets of the items.

In some cases, the items are implemented at least partially using a standard data model. Item identifiers 548 may be part of the standard data model and interface manager 510 may reference item identifiers received in requests to item identifiers 548 of the standard data model. As another example, interface manager 510 may map or translate the received item identifiers or other item identifying information to the standard data model (e.g., to item identifiers 548 of the standard data model). For example, the standard data model may be employed by one or more other components of data aggregation infrastructure 570, and interface manager 510 may translate received information so it is compatible with or useable by the other components. Interface manager 510 could receive requests from various entities that identify items in different formats and/or structures, which may correspond to different data models, and translate them into the standard data model. In some examples, interface manager 510 (whether the interface manager 510 refers to application 428, application 404A, and/or a smart contract on the distributed ledger) records information to the distributed ledger according to the standard data model, and/or reads the information from the distributed ledger according to the standard data model.

Having received a request, entity set determiner 514 may determine a subset of entities that collectively has access to a set of values 532 that captures each of the plurality of the items requested by the entity. Values 532 (which may also be referred to as "item values 532") represent values of items, such as values of items requested by entities, which are used to determine responses to requests. Each value of values 532 may correspond to an item, such as an item defined by the standard data model. For example, for an item representing an age demographic, a value may be an age (e.g., 54), for an item representing a country demographic, a value may be a country (e.g., USA), for an item representing a hobby, a value may be an activity (e.g., cycling). In some embodiments, a request may further identify a subject of one or more of the items, such as an entity to which an item pertains. For example, a request may identify hobbies of a user, and one or more values for the item for the user may be provided including cycling, reading, etc. It should therefore be appreciated that one or more values for an item of a request may be used for an entity.

In some embodiments, a request specifies or identifies one or more entities to which one or more of the items of the request pertains (e.g., subjects of the request). For example, the request may include an entity identifier of an entity associated with the request (e.g., that is a subject of the request). In such a case, the set of values 532 may be determined based on the one or more entities. As an example, entity set determiner 514 may determine an entity and a value of an item accessible by the entity based on the value being associated with (e.g., describing) a subject of the request. Thus, a requesting entity could specify that the values included in a response to the request should pertain to one or more particular entities or subjects (e.g., the age of a particular user, etc.).

In some embodiments, the request is for one or more claims of one or more interrogatories that are based on the values. The one or more interrogatories may be specified in the request or otherwise associated with the request. As an example, a result may comprise a true value for an interrogatory that is true and a false value for an interrogatory that is false. A single interrogatories may be based on one to all of the values of a response. A interrogatories may refer to a logical expression(s) that uses one or more values of one or more items of information to produce a result. As an example, a logical expression could be is a particular user older than 18 (e.g., evaluated using an age item value of the user) and living in one of Europe, USA, and Canada (e.g., evaluated using a country item value of the user). Interrogatories may be implemented using zero-knowledge proofs, described further below.

Item values 532 are shown as being in storage 530 as an example only. In some cases, one or more values 532 that are used to determine a response to a request are determined on the fly from other data (e.g., entity information 418 of FIG. 4). For example, the value may be inferred or derived from other data as needed and may not by stored persistently. As indicated above, one or more of values 532, or data used to derive one or more values 532, may be stored on and/or accessed from the distributed ledger, a user device, and/or a private data store (e.g., of entity system 408). The values may be encrypted/decrypted using any suitable approach, such as using cryptography component 340 or approaches used by cryptography component 340.

One or more of values 532 may be associated with one or more entities. For example, access-related information 540 may capture which entities have access values for which items. In some cases, access-related information 540 records permissions of entities to values 532 and/or data used to derive values 532. For example, access-related information 540 may represent or indicate access rights of entities to the data. Access-related information 540 may be stored on and/or accessed from the distributed ledger, a user device, and/or a private data store (e.g., of entity system 408).

Entity set determiner 514 may use access-related information 540, at least in part, to determine a subset of the entities that collectively has access to a set of the values 532 that captures each of the plurality of the items requested by the entity, to verify the entities have the access rights, and/or to select the subset from a larger set of potential entities that may provide the values. This may include based on the receiving of a request, analyzing access-related information 540 (e.g., a records set) that captures particular ones of the entities based on the particular ones of the entities having access to values of particular ones the items.

In some embodiments, entity set determiner 514 determines the subset of the entities that collectively has access to a set of the values that captures each of the plurality of the items requested by the entity based at least in part on an aggregated contribution of the requesting entity and/or other entities that have provided data for responses to requests by the requesting entity. The aggregated contribution may be captured by one or more aggregated contribution metrics and entity set determiner 514 may analyze previous records (e.g., on the distributed ledger) that correspond to requests and/or responses to requests to determine the aggregated contribution metric(s) from aggregated information regarding data used for exchanges involving the requesting entity.

An aggregated contribution metric may be based at least in part on recorded contribution scores of the requesting entity and/or other entities that have provided data for responses to requests by the requesting entity. Additionally or alternatively, an aggregated contribution metric may be based on any factor used to determine a contribution score described herein, such as level of scarcity, a level of usage, a level of trust, a level of confidence or quality, and/or a quantity.

Based on the one or more aggregated contribution metrics, entity set determiner 514 may select the subset of the entities and/or values. For example, entity set determiner 514 may limit the collective worth of the values in the set of values for the response by a corresponding average aggregated contribution metric for the requester. As an example, entity set determiner 514 may limit the average level of scarcity of the set of values to an average aggregated contribution metric that captures the average level of scarcity of data provided by the requesting entity. As another example, entity set determiner 514 may limit a quantity of the values such that an average aggregated contribution metric that captures the overall quantity of data shared by the requesting entity does not exceed a threshold value. This may be used to prevent an entity from using more data than the entity is providing for use by other entities.

In some cases, entity set determiner 514 may prevent the requesting entity from receiving a response that would violate a limit that is based on an aggregated contribution metric of a requester. The requesting entity may overcome the limit by contributing data to one or more responses to requests by entities in order to raise the requesting entity's aggregated contribution metric. Additionally, or alternatively, entity set determiner 514 may limit the set of values based at least in part a request worth for a request. For example, a higher request worth may result in a higher limit compared to a lower request worth. Using this approach, a requesting entity may compensate for a lower aggregated contribution metric by providing additional monetary value for an exchange.

In some embodiments, entity set determiner 514 determines subset of entities based at least in part on offers 538 from entities to provide the values. Interface manager 510 may receive offers 538 from various entities to provide values for requests. Offer processor 518 may processes offers 538 of values, which may include verifying offers 538 are valid (e.g., offering entities have access to the values), recording offers 538, and/or associating offers 538 with particular requests 536.

In some embodiments, offers may be made by an entity to provide one or more values for one or more items for a particular request. For example, an offer may identify a particular request (e.g., using a request identifier), one or more items (e.g., using item identifiers 548) to which the offer pertains, and/or an entity offering the one or more values (e.g., using entity identifiers 546). However, in some embodiments the offers may not be for a particular request. In this case, the one or more values may be provided for one or more responses to one or more requests, optionally subject to one or more criterion or limitations specified by the offering entity.

As indicated above, one or more of offers 538 may be stored on and/or accessed from the distributed ledger, a user device, and/or a private data store (e.g., of entity system 408). In some cases, offers may be received for a request and/or stored on the distributed ledger based on a transaction (e.g., of a transaction block) on the distributed ledger of the distributed ledger network 110 including a request to which the offer pertains. As an example, offers may be submitted to one or more smart contracts on the distributed ledger which include, or validate, the one or more offers on the distributed ledger (e.g., in one or more corresponding transactions) based on identifying the request on the distributed ledger (e.g., in a transaction block). Optionally, offers 538 include various parameters, such as a defined worth(s) of each offered values and/or the offered values overall. An offer worth may represent a monetary value (e.g., in a cryptocurrency of the distributed ledger) that is to be transferred to the offering entity if the offer is to be used to satisfy a response to the request.

Entity set determiner 514 may use offer processor 518 such that only entities with valid offers are included in the subset of entities, and/or to determine and/or select the subset of entities from or based on the offering entities. For example, entity set determiner 514 may determine one or more sets of entities and/or offers, each of which may be used to satisfy a request. In doing so, entity set determine may ensure that any criteria specified by or otherwise associated with a request and/or offers are satisfied. For example, entity set determiner 514 may analyze the offers, such that the set of offers that collectively satisfy a request will result in a total cost that is less than or equal to a request worth that is specified by the requesting entity for a particular request, is determined based on a monetary balance or limitation on spending specified by the requesting entity, or otherwise. This may include determining a sum of the offer worth of each offer (e.g., and optionally also any fees associated with a request) is less than or equal to the request worth for a request. Additionally or alternatively, a set may be selected and/or validated by entity set determiner 514 based on analyzing access-related information 540 associated with the entities to ensure each entity has access to one or more corresponding values for the set.

In some embodiments, entity set determiner 514 automatically selects a set of entities and/or offers used to satisfy a request (e.g., selecting a lowest cost set from a plurality of the sets). As another example, the entity, such as a user, provides user input that specifies the set of entities and/or offers used to satisfy a request associated with the entity. For example, where this functionality is implemented on the distributed ledger, one or more smart contracts may receive the selection (e.g., in a transaction) and ensure the selection is from an appropriate entity or is otherwise valid (e.g., based on a digital signature of the transaction). As another example, entity system 408 may make the selection on behalf of the requesting entity and/or ensure the selection made by a user is valid (e.g., outside of the distributed ledger network 110). The selection may be made by a user from a list of options presented using presentation manager 516 on a user device, such as user device 402A.

Contribution determiner 512 determines contributions of values 532 of items to sets of values corresponding to requests for items of information. In doing so, contribution determiner 512 may determine contribution scores 550 using scoring algorithm 544. Contribution scores 550 may be determined for a response (e.g., a potential or actual response) to a request and may represent contributions of values to a set of values corresponding to the response. For example, each contribution score may be determined for a particular value of an item and/or a plurality of values of an item. In some embodiments, a contribution score may be determined for an entity providing a plurality of values and/or items, which may be determined as a combination (e.g., sum) of contribution scores for a particular value of an item and/or a plurality of values of an item provided by the entity. In this case, the combined scores may also be referred to as sub-scores of a contribution score.

Contribution scores 550 for values and/or items for a response may in some cases be determined with respect to other values and/or items of the response. Contribution scores 550 may be determined at any suitable time, such as prior to selecting entities for a response, after a response is sent, and/or based on selecting the entities for a response. Further, contribution scores may be determined for potential responses and/or actual responses. Potential responses for a request may refer to, for example, options for sets of entities and/or offers for an actual response (e.g., before one is selected and/or provided to a requesting entity).

As an example, contribution score for a value of an item may be determined relative to each other item and/or value for a response. This may include distributing or dividing a contribution value into the contribution scores. As an example, each contribution score may sum to the contribution value for the response. In some embodiments the contribution value corresponds to the request worth of the request mentioned above. Thus, in some cases, the contribution value may be different for different requests, whereas in others the same contribution value may be used for each request (e.g., the contribution scores may add up to one for each request).

Scoring algorithm 544 comprises one or more formulas and/or steps used to determine contribution scores 550 for a request. In some embodiments, scoring algorithm 544 is executed by and/or integrated at least partially into one or more smart contracts of the distributed ledger. For example, scoring algorithm 544 used for a particular request may be stored on the distributed ledger and/or retrieved or accessed from the distributed ledger to determine contribution scores 550 for a request. In some cases, scoring algorithm 544 comprises a set of executable code, such as one or more scripts and/or program code sets that output contribution scores 550 for a request when executed. In addition to or alternatively from storing scoring algorithm 544 on the distributed ledger, at least some of scoring algorithm 544 may be located off the distributed ledger. In some embodiments, scoring algorithm 544 is accessed via a link, such as a Uniform Resource Identifier (URI), which may comprise a Uniform Resource Locator (URL) or other scoring algorithm identifier located on the distributed ledger. It is noted that different scoring algorithms may be used for different requests.

One or more copies of the distributed ledger may identify a scoring algorithm used to determine contribution scores for a request. For example, as mentioned above, one or more smart contracts used to determine the contribution scores may include and/or identify one or more portions of scoring algorithm 544 (e.g. using a scoring algorithm identifier, which may be a hash of the scoring algorithm). In some cases, a record that is stored on the distributed ledger (described in further detail below) of a response (actual or potential) for a request includes the identifying information of the scoring algorithm used for the request. In various implementations, the scoring algorithm used for a request may be identified or recorded on the distributed ledger in a transparent manner. In some embodiments, a record for a response must be digitally signed by at least the requesting entity (and/or one or more other entities involved in the exchange), on the requesting entity's behalf, such as to ensure the values were provided to the requesting entity or that all parties agree to the exchange.

In embodiments where offer worths are included with offers, contribution scores may be based at least in part on the offer worths for offers used for a response. For example, each value and/or item may be weighted by its corresponding offer worth. As such, in some cases, each contribution score may be based at least partially on a monetary value of its underlying value(s).

Additionally or alternatively, a contribution score for a value(s) may be based at least in part on a level of scarcity of the item(s) corresponding to the value(s). The level of scarcity of an item may generally refer to how available values are for the item for responses to requests (e.g., for a response to the particular request), such as a number of options for a source of a value for a response. In some embodiments, the level of scarcity is based at least in part on analyzing access-related information 540. For example, the level of scarcity may correspond, at least partially, to how many different entities have access to a value for the item (e.g., permissions or access rights), as indicated in access-related information 540. Contribution determiner 512 may analyze access-related information 540 to determine a number of entities having access rights to a value for the item to determine a corresponding contribution score. Additionally, or alternatively, the level of scarcity is based at least in part on analyzing offers 538. For example, contribution determiner 512 may analyze access-related information 540 to determine a number of entities that are offering a value for the item to determine a corresponding contribution score.

Additionally or alternatively, a contribution score for a value(s) may be based at least in part on a level of usage of the item(s) corresponding to the value(s). The level of usage of an item may generally refer to how often values are for the item are requested and/or included in responses to requests, such as a number of times an item was used for a response. In some embodiments, the level of usage is based at least in part on analyzing requests 536. For example, the level of usage may correspond, at least partially, to how many different requests have identified the item, as indicated in requests 536. Contribution determiner 512 may analyze requests 536 to determine a number of times the item has been requested (and/or a number of requests that identify the item) to determine a corresponding contribution score. Additionally, or alternatively, the level of usage is based at least in part on analyzing usage information 534. Usage information 534 may comprise records of usage of items, such as records of responses to requests (also described in further detail below). For example, contribution determiner 512 may analyze usage information 534 to determine a number of responses that correspond to the item (and/or a number of times a value for an item is included in a response) to determine a corresponding contribution score.

Additionally or alternatively, a contribution score for a value(s) may be based at least in part on a level of trust of an entity providing the value(s) for an item(s). A level of trust may generally refer to trustworthiness or reliability of an entity providing a value for an item. In some embodiments, the level of trust is determined based on contribution determiner 512 determining a level of accuracy of values provided by the entity for responses and/or claims that are based on the values made for the responses. For example, the level of accuracy may be determined at least in part by using the values and/or values that can be used to verify values provided by other entities and/or claims made by the other entities using the values for the responses. As an example, entity system 408 or another entity may have access rights to the same values or entity information used to generate the values as an entity that provides the values and/or claims based on the values. Thus, the entity may attest to or validate the information provided by another entity. The level of trust may be based at least in part on a ratio of valid responses, values, and/or claims to invalid responses, values, and/or claims made by an entity. In some cases, contribution determiner 512 uses usage information 534, such as response records to validate the information and/or determine the level of trust.

Additionally or alternatively, a contribution score for a value(s) may be based at least in part on a level of confidence of an entity providing the value(s) for an item(s) in the validity of the value (or corresponding claim). A level of confidence may generally refer to how confident that entity is in the accuracy of the value for an item. The level of confidence, for example, may be provided by the entity with a corresponding offer. A lower level of confidence may result in a lower contribution score than a higher level of confidence. Further, in some cases, the level of trust for an entity described above may be based at least in part on levels of confidence provided by the entity. For example, a level of trust may be based on a level of deviation that may be determined between levels of confidence provided by the entity and the ratio of valid responses, values, and/or claims to invalid responses, values, and/or claims made by an entity, as an example.

Additionally or alternatively, a contribution score for a value(s) may be based at least in part on a quantity of value(s) provided by an entity in the response to the request and/or in multiple prior responses. This quantity may be general for all values provided, or may be item specific. For example, the quantity for a value could represent how many different values for the same item the entity has provided for responses to requests. As another example, a quantity for values provided by an entity for a particular request may represent how many of the values the entity is providing. An entity that provides additional values for the request may have a higher contribution score for those values than an entity that provides fewer values.

It is noted that the resultant contribution scores 550 determined by contribution determiner 512 may depend at least partially on the information available to data aggregation infrastructure 570. For example, as additional requests, responses, offers, and the like are facilitated and recorded by data aggregation infrastructure 570, the information used to determine contribution scores 550 can change over time. As such, contribution scores for a response may be different depending upon when the corresponding request was submitted.

Based on the selecting of the subset of the entities, one or more digitally signed transactions may be created (e.g., in a transaction block) on one or more copies of the distributed ledger of the distributed ledger network 110. The transaction may be created on the distributed ledger, for example, by entity system 408 and/or user device 402A generating the transaction(s), validating the transaction, and/or sending the transactions to one or more nodes of the distributed ledger network 110 (e.g., for inclusion in the transaction block). In addition, or alternatively, a node of the distributed ledger network 110 may perform any combination of this functionality to create the transaction in the transaction block.

The transaction may correspond to a response to a request (e.g., stored as usage information 534). For example, the transaction(s) may represent a record of a response to a request. Further, the transaction(s) may capture and/or identify various information regarding the request and/or the response. Examples of the information includes information identifying entities selected and/or determined for providing the set of values of the items for a request (e.g., using entity identifiers 546), one or more entities requesting the items (e.g., using entity identifiers 546), the items pertaining to the request (e.g., using item identifiers 548), confidence levels, and/or contribution scores (e.g., sub-scores and/or composite scores) of values and/or entities to the set of values (e.g., contribution scores 550).

The response to a request may also be provided based on the selecting of the subset of the entities. For example, one or more smart contracts on the distributed ledger may provide the response, one or more of entity systems 408A-408N may provide the response, and/or one or more user devices 402A-402N may provide the response. It is noted a response may be provided over one or more communications and may come from one or more devices. Further, a response may be pushed or provided to a user device 402A associated with a requesting entity and/or retrieved by the requesting entity. A response to a request may contain one or more of the values provided by the entities. In addition or instead, a response to a request may be based on the one or more values, but may not include any values in the response. For example, a response may include one or more results of one or more interrogatories that are based on the one or more values. As an example, a result may comprise a true value for an interrogatory that is true and a false value for one that is false. A single interrogatory may be based on one to all of the values of a response.

In some embodiments, a result of an interrogatory may be determined using a zero-knowledge proof that is based on the one or more values (e.g., the set of values of the response). The zero-knowledge proof may ensure the entities possess the values without revealing the values themselves. Thus, a requesting entity may more readily rely upon the response. Further, the entities providing the values may maintain scarcity of the values while protecting the privacy of the information.

Figure 6:
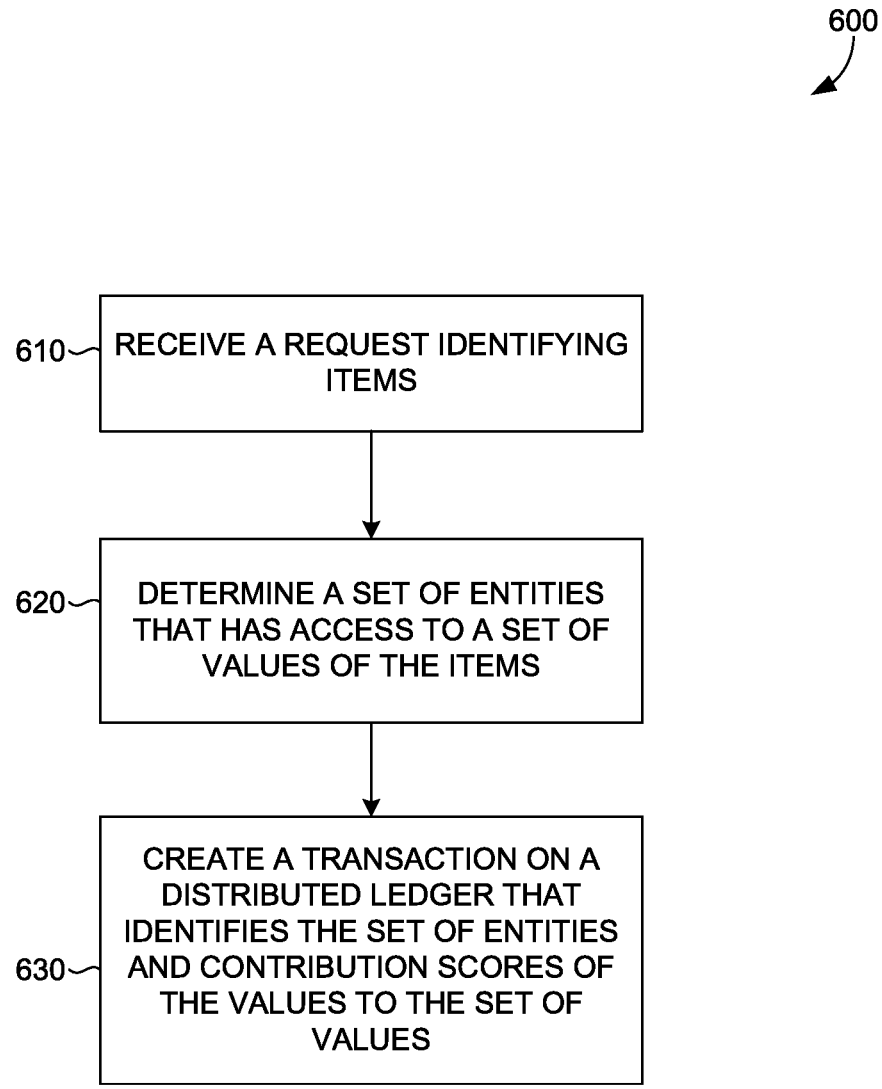
FIG. 6 is a flow diagram showing a method for facilitating sharing of data between entities in accordance with some embodiments of the present invention.

Referring now to FIG. 6, a flow diagram is provided showing an embodiment of a method 600 for facilitating sharing of data between entities using contribution scores. Each block of method 600 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Method 600 is described with respect to entity system 408 by way of example. However, method 600 may be employed by any combination of entity systems 408A-408N (e.g., application(s) 428), user devices 402A-402N (e.g., application(s) 404A), and/or nodes 110A-110N (e.g., one or more smart contracts).

At block 610, method 600 includes receiving a request identifying items. For example, interface manager 510 of entity system 408 may receive a request of requests 536 that identifies a plurality of items (e.g., corresponding to some of item identifiers 548) of information and an entity (e.g., corresponding to one or more of entity identifiers 546) requesting the plurality of the items. The request may be received, for example, from user device 402A. As another example, the request may be received in data (e.g., a transaction block) from the distributed ledger.

At block 620, method 600 includes determining a set of entities that has access to a set of values of the items. For example, entity set determiner 514 of entity system 408 may, based on the receiving of the request, determine a set of entities (e.g., corresponding to entity identifiers 546) that collectively has access to a set of values (e.g., of item values 532) that captures each of the plurality of items requested by the entity. In some cases, the set of entities is determined based on a user or entity selection of the set of entities from a plurality of options for different sets of entities. For example, entity set determiner 514 may optionally analyze offers 538 to automatically generate the options for user or entity selection, and/or may automatically select the set of entities. In embodiments where a user or entity selects the set of entities, the plurality of options may be transmitted to and/or presented (using presentation manager 516) on user device 402A and/or another entity system 408N. For example, entity system 408 may provide a marketplace in which offers 538 can be matched to requests 536 using user or entity defined and/or system defined criteria.

At block 630, method 600 includes creating a transaction on a distributed ledger that identifies the set of entities and contribution scores of the values to the set of values. For example, based on the determining of the set of entities, interface manager 510 and/or consensus module 330 of entity system 408 may create a transaction(s) (e.g., in a transaction block) on one or more copies of a distributed ledger maintained at least in part by one or more nodes 110A-110N of distributed ledger network 110. This may include entity system 408 generating, transmitting, and/or receiving the digitally signed transaction. The transaction may identify the set of entities, and contribution scores of the values to the set of values. Each contribution score for a given value of an item may be based on various factors described herein, such as a level of scarcity of the item and a level of usage of the item. Further, the one or more copies of the distributed ledger may identify scoring algorithm 544 used to determine the contribution scores. For example, the transaction(s) may include an identifier of or link to scoring algorithm 544 (e.g., on the distributed ledger). As another example, the distributed ledger may identify one or more smart contracts used to determine the contribution scores, which employs scoring algorithm 544. The contribution scores may have been determined or generated by entity system 408 or the one or more smart contracts using scoring algorithm 544.

Figure 7:
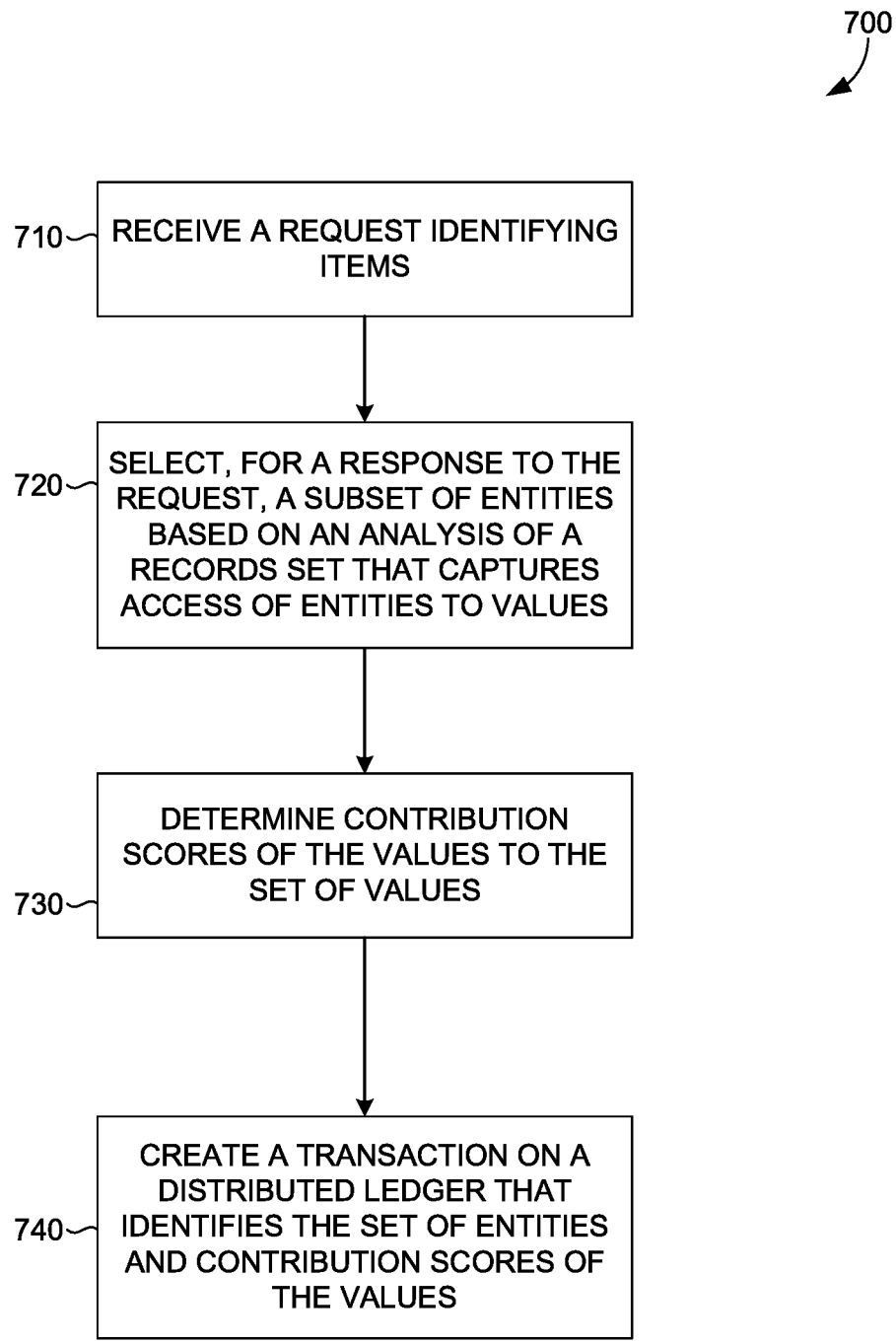
FIG. 7 is a flow diagram showing a method for facilitating sharing of data between entities in accordance with some embodiments of the present invention.

Referring now to FIG. 7, a flow diagram is provided showing an embodiment of a method 600 for facilitating sharing of data between entities using contribution scores. Method 700 is described with respect to node 110N by way of example. However, method 600 may be employed by any combination of entity systems 408A-408N (e.g., application(s) 428), user devices 402A-402N (e.g., application(s) 404A), and/or nodes 110A-110N (e.g., one or more smart contracts).

At block 710, method 700 includes receiving a request identifying items. For example, interface manager 510 of node 110N may receive a request of requests 536 that identifies a plurality of items (e.g., corresponding to some of item identifiers 548) of information and an entity (e.g., corresponding to one or more of entity identifiers 546) requesting the plurality of the items. The request may be received, for example, from user device 402A or entity system 408. As an example, the request may be received in data (e.g., a transaction block) from the distributed ledger and/or as a digitally sign transaction for inclusion on the distributed ledger (e.g., in a transaction block).

At block 720, method 700 includes selecting, for a response to the request, a subset of entities based on an analysis of a records set that captures access of entities to values. For example, entity set determiner 514 of node 110N may analyze transactions on the distributed ledger, which may include access-related information 540 (e.g., records of permissions), that captures particular ones of the entities based on the particular ones of the entities having access to values of particular ones the items. Based on the analyzing of the records set, entity set determiner 514 of node 110N may select, for a response to the request, a subset of the entities that collectively has access to a set of the values that captures each of the plurality of the items requested by the entity. For example, the analyzing may be to ensure the subset of entities has access rights to values for the item. The selecting may be performed, for example, by one or more smart contracts of the distributed ledger.

At block 730, method 700 includes determining contribution scores of the values to the set of values. For example, contribution determiner 512 of node 110N may determine contribution scores of the values to the set of values using scoring algorithm 544. Each contribution score for a given value of an item may be based on a level of scarcity of the item indicated by the records set and a level of usage of the item indicated by the records set. The determining of the contribution scores may be performed by one or more contracts on the distributed ledger, and may be triggered by the selecting of the subset of the entities, the receiving of the request, and/or the receiving of one or more of offers 538. In some cases, the contribution scores may be determined and/or generated prior to the receiving of the request and/or selection of the subset of entities.

At block 740, method 700 includes creating a transaction(s) on a distributed ledger that identifies the set of entities and the contribution of the values. For example, consensus module 330 may create a record of a response to the request and/or selection of the subset of the entities on the distributed ledger. This may include one or more smart contracts generating the transaction and/or verifying the transaction.

Figure 8:
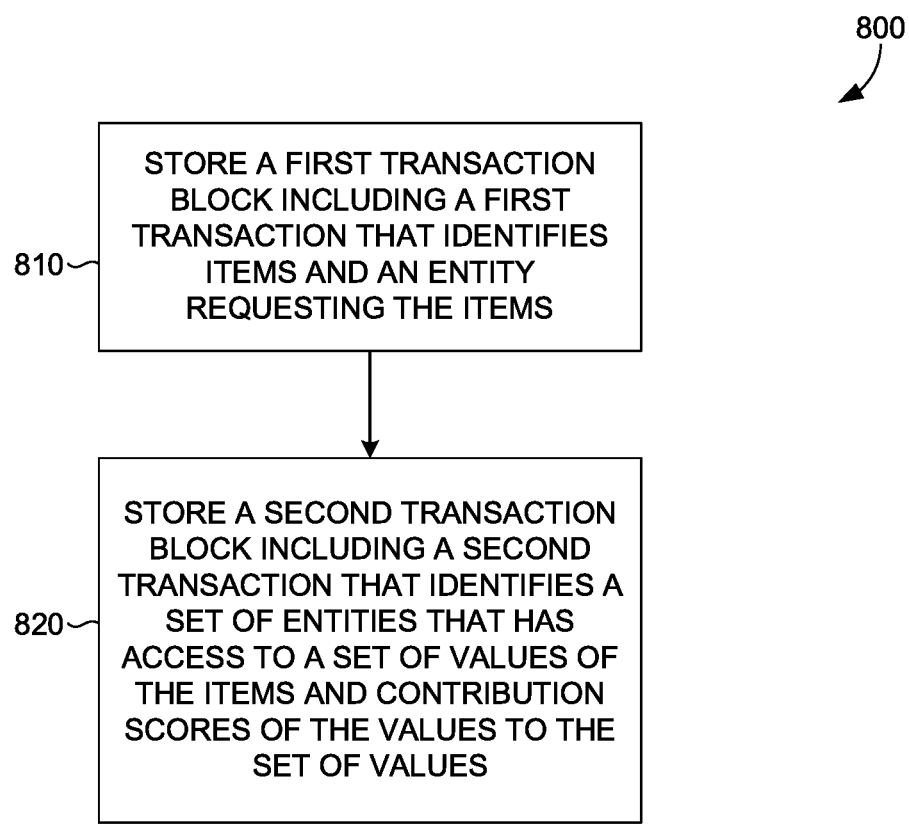
FIG. 8 is a flow diagram showing a method for facilitating sharing of data between entities in accordance with some embodiments of the present invention.

Referring now to FIG. 8, a flow diagram is provided showing an embodiment of a method 800 for facilitating sharing of data between entities using contribution scores. Method 800 is described with respect to node 110N by way of example. However, method 800 may be employed by any combination of entity systems 408A-408N (e.g., application(s) 428), user devices 402A-402N (e.g., application(s) 404A), and/or nodes 110A-110N (e.g., one or more smart contracts).

At block 810, method 800 includes storing, on a distributed ledger, a first transaction block including a first transaction that identifies items and an entity requesting the items. For example, consensus module 330 may receive, generate, and/or validate a transaction block that includes a record of a request for the items.

At block 820, method 800 includes storing a second transaction block including a second transaction that identifies a set of entities that has access to a set of values of the items and contribution scores of the values to the set of values. For example, consensus module 330 may receive, generate, and/or validate a transaction block that includes a record of a response to the request and/or selection of the set of the entities on the distributed ledger. In some cases, one or more smart contracts causes the storing based on identifying the first transaction in the first transaction block.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 9:
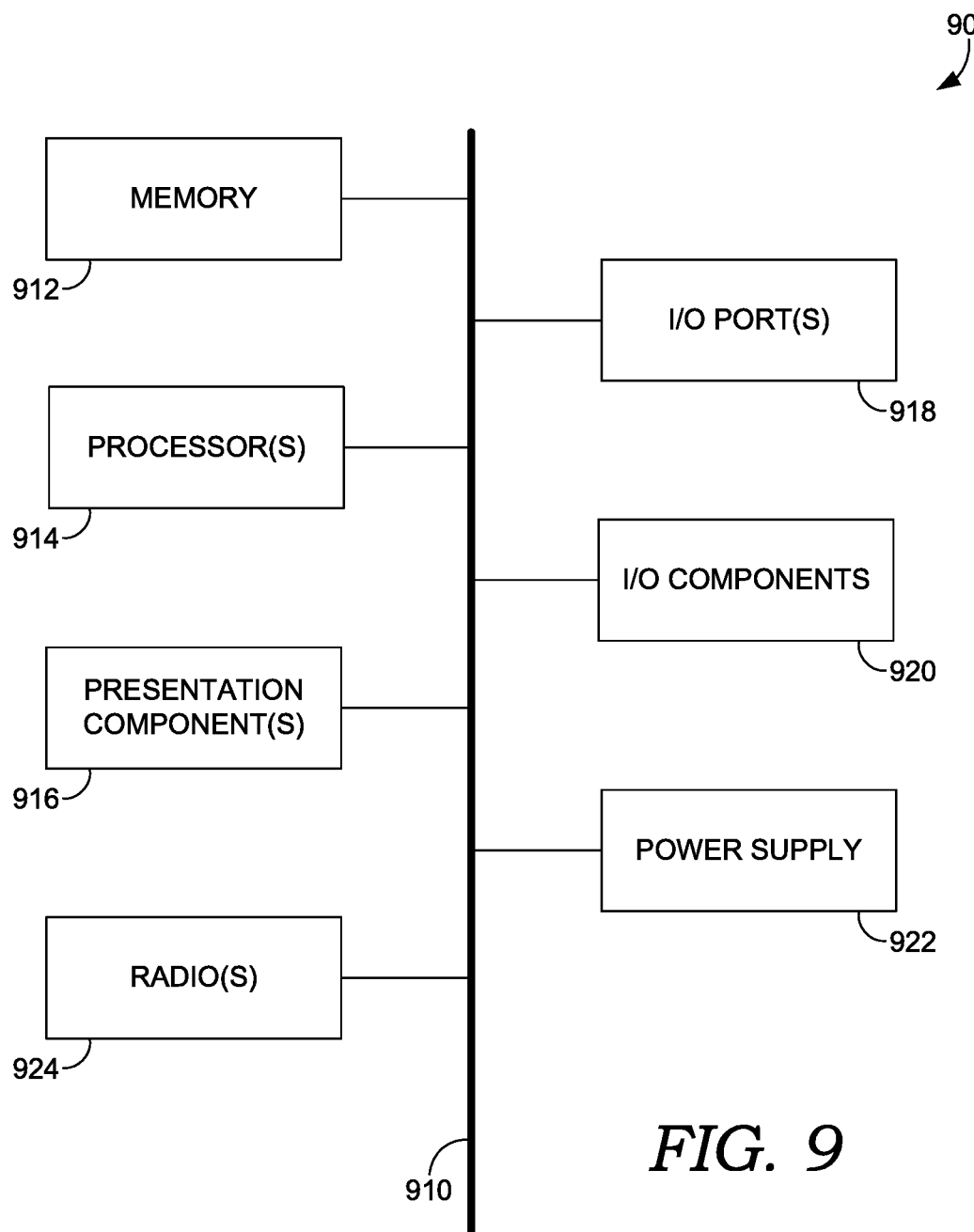
FIG. 9 is a block diagram of an example computing environment suitable for use in implementing some embodiments of the present invention.

With reference to FIG. 9, computing device 900 includes a bus 910 that directly or indirectly couples the following devices: memory 912, one or more processors 914, one or more presentation components 916, input/output (I/O) ports 918, input/output components 920, and an illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 9 is merely illustrative of an example computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer-storage media in the form of volatile and/or nonvolatile memory. The memory may be removable, non-removable, or a combination thereof. Example hardware devices include solid-state memory, hard drives, optical-disc drives, etc. Computing device 900 includes one or more processors that read data from various entities such as memory 912 or I/O components 920. Presentation component(s) 916 present data indications to a user or other device. Example presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be equipped with depth cameras, such as stereoscopic camera systems, infrared camera systems, RGB camera systems, touchscreen technology, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

As can be understood, embodiments of the present invention provide for, among other things, facilitating the sharing of data between entities using contribution scores. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer-implemented method for attributing contribution to multiparty data aggregation, the method comprising:

receiving a request identifying a plurality of items of information and an entity requesting the plurality of the items;

based on the receiving of the request, selecting a subset of offers from a plurality of offers from entities that are different than the entity requesting the plurality of information, the plurality of offers being for the entities to provide access to values of specified ones of the items for use in generating a response to the request, wherein the selecting includes analyzing terms of the plurality of offers and verifying the access for a set of the values that captures each of the plurality of items requested by the entity; and based on the selecting of the subset of offers, creating a transaction on one or more copies of a distributed ledger maintained at least in part by one or more nodes of a distributed ledger system, the transaction digitally signed and identifying a subset of the entities that correspond to the subset of offers, the plurality of items, and contribution scores corresponding to the set of the values.

2. The method of claim 1, further comprising:

creating another transaction on the distributed ledger of the distributed ledger system, the another transaction digitally signed and identifying the plurality of items requested by the entity; and based on the creating of the another transaction, receiving, over one or more network communications, the plurality of offers from the entities, wherein a contribution score of the contribution scores for a given value of an item corresponds to how many of the entities offered a value of the item for the response.

3. The method of claim 1, wherein each contribution score for a given value of an item is based on a level of scarcity of the item, the level of scarcity of the item being determined, from one or more digitally signed transactions on the distributed ledger, and corresponding to how many of the entities have the access for the item.

4. The method of claim 1, based on the determining of the subset of offers, providing a response to the request without revealing the set of the values to the entity, wherein the generating includes evaluating a statement that corresponds to the request using the set of the values received based on the selecting of the subset of offers and a zero-knowledge proof that is based on the set of the values.

5. A non-transitory computer storage media storing computer-useable instructions that, when used by one or more computing devices, cause the one or more computing devices to perform a method comprising:

receiving a request identifying a plurality of items of information and an entity requesting the plurality of the items;

based on the receiving of the request, selecting a subset of offers from a plurality of offers submitted by entities that are different than the entity requesting the plurality of information in response to the request, the plurality of offers being for the entities to provide access to values of specified ones of the items for use in generating a response to the request, wherein the selecting includes analyzing terms of the plurality of offers and verifying the access for a set of the values that captures each of the plurality of the items requested by the entity, and the verifying uses a records set that records which of the entities have access to the values of which of the items;

determining contribution scores of the set of the values using a scoring algorithm, wherein each contribution score for a given value of an item is based on a level of scarcity of the item that corresponds how many of the entities have the access for the item as indicated by the records set and a level of usage of the item that corresponds to how many requests have involved the item as indicated by the records set; and based on the selecting of the subset of the entities, creating a transaction of a transaction block on one or more copies of a blockchain maintained at least in part by one or more nodes of a distributed ledger system, the transaction digitally signed and identifying a subset of the entities that correspond to the subset of offers, and the contribution scores of the set of values.

6. The computer storage media of claim 5, wherein the records set records the entities having the access in one or more digitally signed transactions in one or more blocks of the blockchain.

7. The computer storage media of claim 5, wherein the request is received from one or more digitally signed transactions in one or more blocks of the blockchain, and the method includes identifying the plurality of the items and the entity in the one or more digitally signed transactions.

8. The computer storage media of claim 5, wherein the request is received over one or more network communications from a user device associated with the entity, and the method includes based on the receiving of the request, creating another transaction of another transaction block on the blockchain of the distributed ledger system, the another transaction digitally signed and identifying the plurality of items requested by the entity.

9. The computer storage media of claim 5, wherein the method includes:

creating another transaction of another transaction block on the blockchain of the distributed ledger system, the another transaction digitally signed and identifying the plurality of items requested by the entity; and based on creating of the another transaction, receiving, over one or more network communications, the plurality of offers, wherein each offer specifies a worth of the offer and a contribution score that corresponds to the offer is computed from the worth.

10. The computer storage media of claim 5, wherein the records set records access rights of particular ones of the entities to the values, and the verifying is based on evaluating the access rights.

11. The computer storage media of claim 5, wherein the level of scarcity of the item is based on determining, from the records set, a number of entities that have the access for the item.

12. The computer storage media of claim 5, wherein the level of usage of the item is based on determining, from the records set, a number of the usages of the item, each usage corresponding to a respective request of the item.

13. The computer storage media of claim 5, wherein each contribution score for a given value of an item is further based on a level of accuracy of the given value.

14. The computer storage media of claim 5, wherein each contribution score for a given value of an item is further based on a level of trust in a given entity that has access to the given value.

15. The computer storage media of claim 5, wherein the selecting of the subset of offers is based at least in part on one or more aggregated contribution metrics of the requesting entity, the one or more aggregated contribution metrics based on a plurality responses in which the requesting entity at least one of provided at least one value for a response or received the response based on the at least one value.

16. The computer storage media of claim 5, comprising based on the selecting, providing the response to the request without revealing to the entity the set of the values that were accessed to generate the response, wherein the response includes an outcome of validating a statement that corresponds to the request using a zero-knowledge proof that is based on the set of the values.

17. The computer storage media of claim 5, wherein the plurality of the items comprise user information and the request is for the user information for a particular user.

18. A computer-implemented system for sharing data, comprising:

one or more processing units;

one or more memory devices storing instructions thereon that, when executed using the one or more processing units, cause the one or more processing units to execute operations comprising:

selecting a subset of offers from a plurality of offers from entities, the plurality of offers being for the entities to provide access to values of specified ones of the items for use in generating a response to a request from an entity that is different than the entities, wherein the selecting includes analyzing terms of the plurality of offers and determining the access for a set of the values that captures each of the plurality of items of information; and based on the selecting, creating a transaction on one or more copies of a distributed ledger maintained at least in part by one or more nodes of a distributed ledger system, the transaction digitally signed and identifying a subset of the entities that correspond to the subset of offers, the plurality of items, and contribution scores corresponding to the set of the values.

19. The system of claim 18, further comprising determining the contribution scores based on levels of scarcity of the items.

20. The system of claim 18, further comprising determining the contribution scores based on levels of usage of the items.

* * * * *

UNITED STATES PATENT AND TRADEMARK OFFICE
CERTIFICATE OF CORRECTION

PATENT NO. : 11,048,690 B2
APPLICATION NO. : 16/198541
DATED : June 29, 2021
INVENTOR(S) : Kevin Gary Smith et al.

It is certified that error appears in the above-identified patent and that said Letters Patent is hereby corrected as shown below:

On the Title Page

In Column 2, item (57), Abstract, Line 3, delete "determined" and insert -- determined. --, therefor.

In the Specification

In Column 15, Line 7, delete "a the" and insert -- a --, therefor.

In Column 19, Line 7, after "be" delete "is".

In Column 19, Line 48, after "ones" insert -- of --.

In Column 27, Line 4, after "ones" insert -- of --.

In the Claims

In Column 32, Line 11, Claim 15, after "plurality" insert -- of --.

Signed and Sealed this
Fourteenth Day of September, 2021

Drew Hirshfeld
*Performing the Functions and Duties of the
Under Secretary of Commerce for Intellectual Property and
Director of the United States Patent and Trademark Office*